(12) United States Patent
Noh et al.

(10) Patent No.: US 10,886,083 B2
(45) Date of Patent: Jan. 5, 2021

(54) SWITCH KNOB AND OPERATING MODULE HAVING THE SAME

(71) Applicant: LS Automotive Technologies Co., Ltd., Ansan-si (KR)

(72) Inventors: Sam Jong Noh, Incheon (KR); Jong Hak Jeon, Anyang-si (KR)

(73) Assignee: LS AUTOMOTIVE TECHNOLOGIES CO., LTD., Ansan-si (KR)

( * ) Notice: Subject to any disclaimer, the term of this patent is extended or adjusted under 35 U.S.C. 154(b) by 12 days.

(21) Appl. No.: 16/345,223

(22) PCT Filed: Oct. 27, 2017

(86) PCT No.: PCT/KR2017/012007
§ 371 (c)(1),
(2) Date: Apr. 25, 2019

(87) PCT Pub. No.: WO2018/080234
PCT Pub. Date: May 3, 2018

(65) Prior Publication Data
US 2019/0295790 A1 Sep. 26, 2019

(30) Foreign Application Priority Data

Oct. 27, 2016 (KR) .................. 10-2016-0140994
Sep. 19, 2017 (KR) .................. 10-2017-0120545

(51) Int. Cl.
*H01H 25/06* (2006.01)
*H01H 25/04* (2006.01)
(Continued)

(52) U.S. Cl.
CPC ............. *H01H 25/06* (2013.01); *B60R 16/00* (2013.01); *H01H 13/14* (2013.01); *H01H 19/14* (2013.01);
(Continued)

(58) Field of Classification Search
CPC ........ H01H 25/06; H01H 13/14; H01H 19/14; H01H 25/04; B60R 16/00
(Continued)

(56) References Cited

FOREIGN PATENT DOCUMENTS

| JP | A2008021613 | * | 7/2006 | ............... H01H 9/18 |
| JP | 2008021613 A | | 1/2008 | |

(Continued)

*Primary Examiner* — Edwin A. Leon
*Assistant Examiner* — Iman Malakooti
(74) *Attorney, Agent, or Firm* — Rabin & Berdo, P.C.

(57) ABSTRACT

The present invention provides an operating module comprising: a vehicular multi-operating switch unit; a module housing configured to allow the vehicular multi-operating switch unit to be movably accommodated therein; a module drive unit disposed in the module housing and configured to generate a driving force that moves the module housing; a module unit shuttle configured to allow the vehicular multi-operating switch unit to be accommodated therein, the module unit shuttle being movably disposed in the module housing; and a module drive transfer unit connected at one side thereof to the module drive unit and connected at the other side thereof to the module unit shuttle, and configured to transfer a driving force that moves the vehicular multi-operating switch unit relative to the module housing, wherein a switch knob is provided at an end of the switch shaft unit, is moved together with the module unit shuttle in response to the movement of the module unit shuttle, and forms a grip for a user, and wherein a module optical unit s provided at the module housing and is configured to display an operation state of the switch knob, including whether or not the switch knob can be operated.

24 Claims, 17 Drawing Sheets

(51) Int. Cl.
*B60R 16/00* (2006.01)
*H01H 13/14* (2006.01)
*H01H 19/14* (2006.01)

(52) U.S. Cl.
CPC ....... *H01H 25/04* (2013.01); *H01H 2219/036* (2013.01); *H01H 2219/06* (2013.01); *H01H 2219/062* (2013.01); *H01H 2231/026* (2013.01)

(58) Field of Classification Search
USPC ...................................................... 200/17 R
See application file for complete search history.

(56) References Cited

FOREIGN PATENT DOCUMENTS

| | | | | | |
|---|---|---|---|---|---|
| JP | 2013093155 | A | | 5/2013 | |
| KR | 200441429 | Y1 | | 8/2008 | |
| KR | 1020120071027 | A | | 7/2012 | |
| KR | 1020140148226 | | * | 5/2016 | ............. H01H 25/04 |
| KR | 1020160052896 | A | | 5/2016 | |

* cited by examiner

SWITCH KNOB AND OPERATING MODULE HAVING THE SAME

TECHNICAL FIELD

The present invention relates to a switch knob, and more particularly, to a switch knob for manipulation by a user and an operating module having the same.

BACKGROUND ART

A vehicle requires its functions as a variety of kinds of convenient means capable of providing a more stable and comfortable driving state for a user in addition to its function as a means for transportation. Thus, the vehicle is equipped with various convenient devices and a variety of kinds of switches for operating and controlling them.

For example, the steering wheel of a vehicle which is recently produced includes a window switch for opening or closing a window, a steering light switch for turning on or off a steering light, an audio switch for driving an audio device, a wiper switch for driving a wiper, and a multi-function switch. The multi-function switch assembly is used to operate a light and a fog lamp, a wiper, various audio devices, a vehicle window, and the like. The multi-functional switch assembly serves to prevent the driver's driving attention from being dissipated despite manipulation of a wide variety of devices during driving by increasing the manipulability of the various devices. The multi-functional switch assembly is implemented as a button switch type mounted on a top of the steering wheel, or a lever switch type mounted on a side of the steering wheel.

The switch of the vehicle follows a recent trend toward an intensive combination of switches having various functions. The structure of the vehicular switch becomes more complicated in proportion to an increase in functions of the switch, thus leading to an increase in the possibility of erroneous operation of the switch. For this reason, a lighting function is additionally imparted to the switch to improve visibility of the user, and thus a switch is being developed which can prevent erroneous manipulation of the switch by the user.

DISCLOSURE OF INVENTION

Technical Problem

Accordingly, the present invention has been made to solve the above-mentioned problems occurring in the prior art, and it is an object of the present invention to provide a switch knob that can improve visibility of a user to prevent an erroneous manipulation by the user, a vehicular multi-operating switch unit having the same, and an operating module.

Technical Solution

To achieve the above object, in one aspect, the present invention provides a switch knob including: a knob housing including a knob marking part formed thereon so that light can be transmitted to and from the knob housing through the knob marking part; and a knob lighting unit disposed in the knob housing so as to irradiate light to the knob marking part, wherein the knob lighting unit comprises a knob light source element configured to emit light, and a knob lighting guide configured to guide light emitted from the knob light source element to the knob marking part, and wherein the knob lighting guide includes: a lighting guide body including a lighting guide light entering part formed at the outer edge thereof so as to confront the knob light source element; and a lighting guide light exiting part formed on one surface thereof so as to confront the knob marking part; and a lighting guide embossing part including one or more lighting guide reflective lugs formed protrudingly outwardly from the other surface of the lighting guide body so as to reflect light entering the inside of lighting guide body through the lighting guide light entering part to the lighting guide light exiting parts.

The lighting guide embossing part may include one or more side embossing parts disposed at an outer periphery of the center of the other surface of the lighting guide body.

Preferably, the knob marking part may include one or more side markings disposed at positions corresponding to the side embossing parts, and the area of the side embossing part may be larger than that of the side marking.

Preferably, the knob marking part may include a center marking disposed at the center of the side markings to correspond to the center of the lighting guide body, wherein the lighting guide embossing part comprises a center embossing part disposed the center of the other surface of the lighting guide body to correspond to the center marking, and wherein the area of the center embossing part may be larger than that of the center marking.

Preferably, the diameter of the lighting guide reflective lug of the center embossing part may be smaller than that of the lighting guide reflective lug of the side embossing part.

Preferably, the spacing between the lighting guide reflective lugs of the center embossing part may be larger than that between the lighting guide reflective lugs of the side embossing part.

The lighting guide light entering part may be arranged in plural numbers along the outer edge of the lighting guide body, and the knob light source element may be arranged in plural numbers so as to confront the plurality of lighting guide light entering parts.

The lighting guide body may be formed as a symmetrical structure, and the side embossing part may be arranged in plural numbers in a point-symmetric manner based on the center point of weight of the lighting guide body.

Preferably, the lighting guide body may be formed in an octagonal shape having eight sides, and the lighting guide light entering part may be arranged in plural numbers (e.g., four) in such a manner to be disposed at positions corresponding respectively to two pairs of sides confronting each other among the eight sides of the lighting guide body, and the sides on which the lighting guide light entering parts are arranged among the sides of the lighting guide body may be shorter than the other remaining sides of the lighting guide body.

The lighting guide body may include one or more lighting guide fixing grooves formed respectively on sides on which the lighting guide light entering parts are not arranged among the sides of the light guide body, and a plurality of knob support lugs may be disposed in the knob housing so as to be at least partially inserted into the plurality of lighting guide fixing grooves, respectively, to support the lighting guide body to prevent the lighting guide body from being displaced.

The lighting guide light exiting part may be formed in a concaved shape.

The switch knob according to the present invention may further includes a confirmation switch unit including a confirmation switch knob disposed at a side of the knob housing so as to be operated in a pressable manner, and a confirmation switch disposed in the knob housing so that the confirmation switch can be operated in response to the movement of the confirmation switch knob to generate an electrical signal, wherein the operation of the knob lighting unit may be controlled depending on the operation of the confirmation switch unit.

In the meantime, in another aspect, the present invention provides an operating module including: a vehicular multi-operating switch unit including a housing unit, a substrate disposed in the housing unit, a switch shaft unit disposed movably so as to be received at one end thereof in the housing unit and exposed at the other end thereof to the outside of the housing unit, a rotary switch unit configured to detect an axial rotation of the switch shaft unit and output a signal indicating the detection of the axial rotation, a directional switch unit configured to detect a tilting directional operation of the switch shaft unit and output a signal indicating the detection of the tilting directional operation, and a push switch unit configured to detect a pressure type push operation of the switch shaft unit and output a signal indicating the detection of the pressure type push operation; a module housing configured to allow the vehicular multi-operating switch unit to be movably accommodated therein; a module drive unit disposed in the module housing and configured to generate a driving force that moves the module housing; a module unit shuttle configured to allow the vehicular multi-operating switch unit to be accommodated therein, the module unit shuttle being movably disposed in the module housing; and a module drive transfer unit connected at one side thereof to the module drive unit and connected at the other side thereof to the module unit shuttle, and configured to transfer a driving force that moves the vehicular multi-operating switch unit relative to the module housing, wherein a switch knob is provided at an end of the switch shaft unit, is moved together with the module unit shuttle in response to the movement of the module unit shuttle, and forms a grip for a user, and wherein a module optical unit is provided at the module housing and is configured to display an operation state of the switch knob, including whether or not the switch knob can be operated.

The module optical unit may include: a module optical substrate disposed in the module housing; a module optical element disposed on one surface of the module optical substrate; and a module optical transfer part disposed on one surface of the module housing so that an at least partial surface thereof can be exposed to the outside, and configured to allow light entering the module optical transfer part from the optical element to exit the exposed partial surface of the module optical transfer part.

The module optical transfer part may be implemented in a shape of a cap that has a module optical transfer through-hole formed at the center thereof and includes a module optical transfer inclined part formed inclinedly on the outer circumference thereof, and wherein the module optical transfer part may include: a module optical transfer entering part formed on a bottom surface thereof and configured to allow light exiting the module optical element to enter the module optical transfer part through the module optical transfer entering part; and a module optical transfer reflective recess formed in a shape of a depression on the module optical transfer inclined part and configured to reflect the light entering the module optical transfer part through the module optical transfer entering part and transfer the entering light to a top end of the module optical transfer part.

The module drive unit may be operated in response to a signal from a module switch to lift or lower the vehicular multi-operating switch unit relative to the module housing.

The operating module according to the present invention may include a module limiter unit disposed in the module housing and configured to detect a limit position movement of the module unit shuttle.

The module limiter unit may include: a module limiter substrate 71 disposed in the module housing; a module limiter sensor 73 disposed on the module limiter substrate; and a module limiter moving part 35 disposed on an outer circumferential portion of the module unit shuttle so as to correspond to the position of the module limiter sensor.

The module limiter moving part may include: an upper limiter moving part disposed on a circumferential top portion of a side of the module unit shuttle; and a lower limiter moving part disposed at a lower end of the module unit shuttle so as to be spaced apart from the upper limiter moving part.

A confirmation switch unit may further be provided at the switch knob and is configured to generate a signal for confirming whether or not an operation selected by the user is performed when the vehicular multi-operating switch unit is operated by manipulation of the switch knob by a user.

A knob lighting unit may be provided at the switch knob and is configured to display an operating state of the switch knob, including whether or not the switch knob can be operated.

The switch knob may include a knob housing, wherein a knob substrate may be disposed in the knob housing, and wherein the knob lighting unit may include: a knob lighting element disposed on the knob substrate; and a knob lighting transfer unit configured to transfer light exiting the knob lighting element to the outside.

The knob lighting transfer unit may include: a knob lighting transfer body disposed in the knob housing; a knob lighting transfer display part disposed on one surface of the knob lighting transfer body so as to be exposed to the outside; and a knob lighting transfer grating configured to prevent light entering the knob lighting transfer body from exiting the knob lighting transfer body to the outside.

The knob lighting element may be disposed at a side of the knob lighting transfer body, and the knob lighting transfer body may include a knob lighting transfer side formed at a side thereof and configured to permit the incidence of light exiting the knob lighting element thereon.

The switch knob of the operating module according to the present invention may be coupled to a distal end of the switch shaft unit, the switch knob including: a knob housing including a knob marking part formed thereon so that light can be transmitted to and from the knob housing through the knob marking part; and a knob lighting unit disposed in the knob housing so as to irradiate light to the knob marking part, wherein the knob lighting unit may include a knob light source element configured to emit light, and a knob lighting guide configured to guide light emitted from the knob light source element to the knob marking part, and wherein the knob lighting guide may include: a lighting guide body including a lighting guide light entering part formed at the outer edge thereof so as to confront the knob light source element; and a lighting guide light exiting part formed on one surface thereof so as to confront the knob marking part; and a lighting guide embossing part including one or more lighting guide reflective lugs formed protrudingly outwardly from the other surface of the lighting guide body so as to reflect light entering the inside of lighting guide body through the lighting guide light entering part to the lighting guide light exiting parts.

Advantageous Effects

The switch knob and the operating module having the same according to the embodiments of the present invention as constructed above have the following advantageous effects.

According to the present invention, a high quality switch knob can be implemented in which the knob marking part included in the switch knob can irradiate light so as not to allow a shade to occur using the knob lighting unit.

In addition, according to the present invention, the vehicular multi-operating switch unit can be provided in which visibility of the switch knob can be improved to an erroneous manipulation by a user.

According to the present invention, a switch unit can be provided which is mounted on a steering wheel, a console switch or the like of a vehicle to enable to implement a combined operation so that a user can selectively adjust the electrical operation of electric/electronic devices used in the interior of the vehicle, such as a vehicular navigation device, an audio multimedia device or an air-conditioning device.

In addition, the vehicular multi-operating switch unit of the present invention can minimize the number of constituent elements and enables switch sensor and the like to be intensively disposed on a single substrate to minimize a problem associated with the electrical wiring and thus enhance a degree of design improve assemblability, leading to an reduction in the manufacturing cost due to an increase in productivity.

Further, the vehicular multi-operating switch unit of the present invention can minimize a mounting space through a compact configuration for use of a single substrate or division of an arrangement region for various operations, and eliminate or minimize the possibility of an erroneous operation due to interference between constituent elements Moreover, the operating module of the present invention can eliminate or minimize the possibilities of interference, erroneous manipulation and damage due to a user's body touch through its pop-up operation performed during activation and its pop-down operation performed during inactivation.

Besides, the operating module of the present invention can eliminate or minimize the possibility of a damage due to an excessive operation in the process of performing the pop-up of the operating module during activation and the pop-down of the operating module during inactivation.

In addition, the operating module of the present invention can implement a structure that achieves a stable operation in the process of performing the pop-up of the operating module during activation and the pop-down of the operating module during inactivation.

Also, the operating module of the present invention can detect and confirm a user's manipulation intention during the execution of a vehicle safety-related operation mode so as to eliminate the possibility of an erroneous operation due to an unintentional contact by a user through the confirmation switch unit.

In addition, the operating module of the present invention enables a user to visually recognize the operating state of the operating module through the module optical unit, and the module optical transfer part of the module optical unit includes the module optical transfer reflective recess so that the optical efficiency can be improved.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

Figure 1:
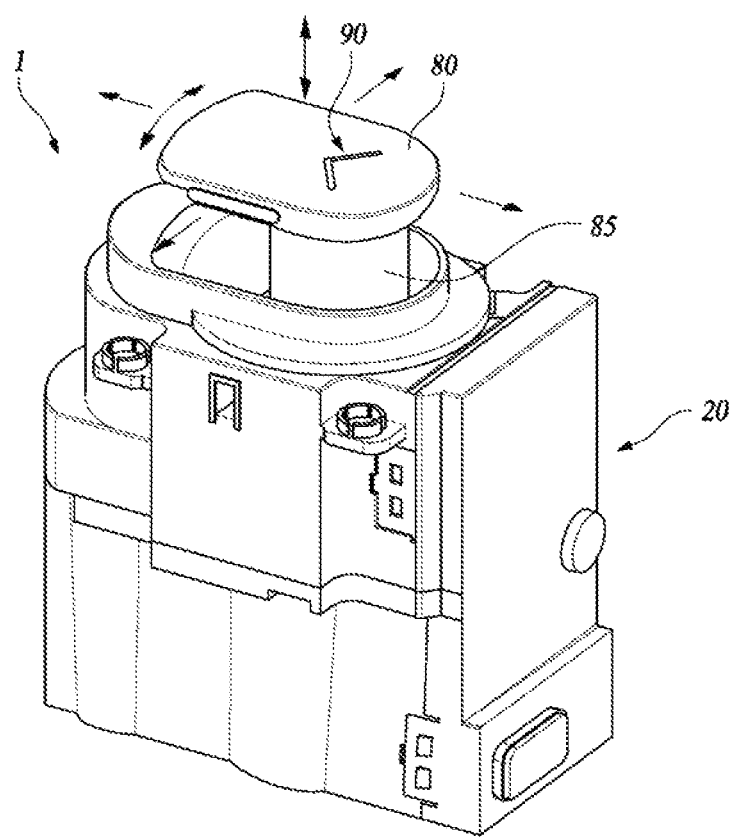
FIG. 1 is a perspective view illustrating an operating module according to one embodiment of the present invention.

Now, preferred embodiments of the present invention will be described hereinafter in detail with reference to the accompanying drawings. It should be noted that the same elements in the drawings are denoted by the same reference numerals although shown in different figures. In the following description, the detailed description on known function and constructions unnecessarily obscuring the subject matter of the present invention will be avoided hereinafter.

Figure 2:
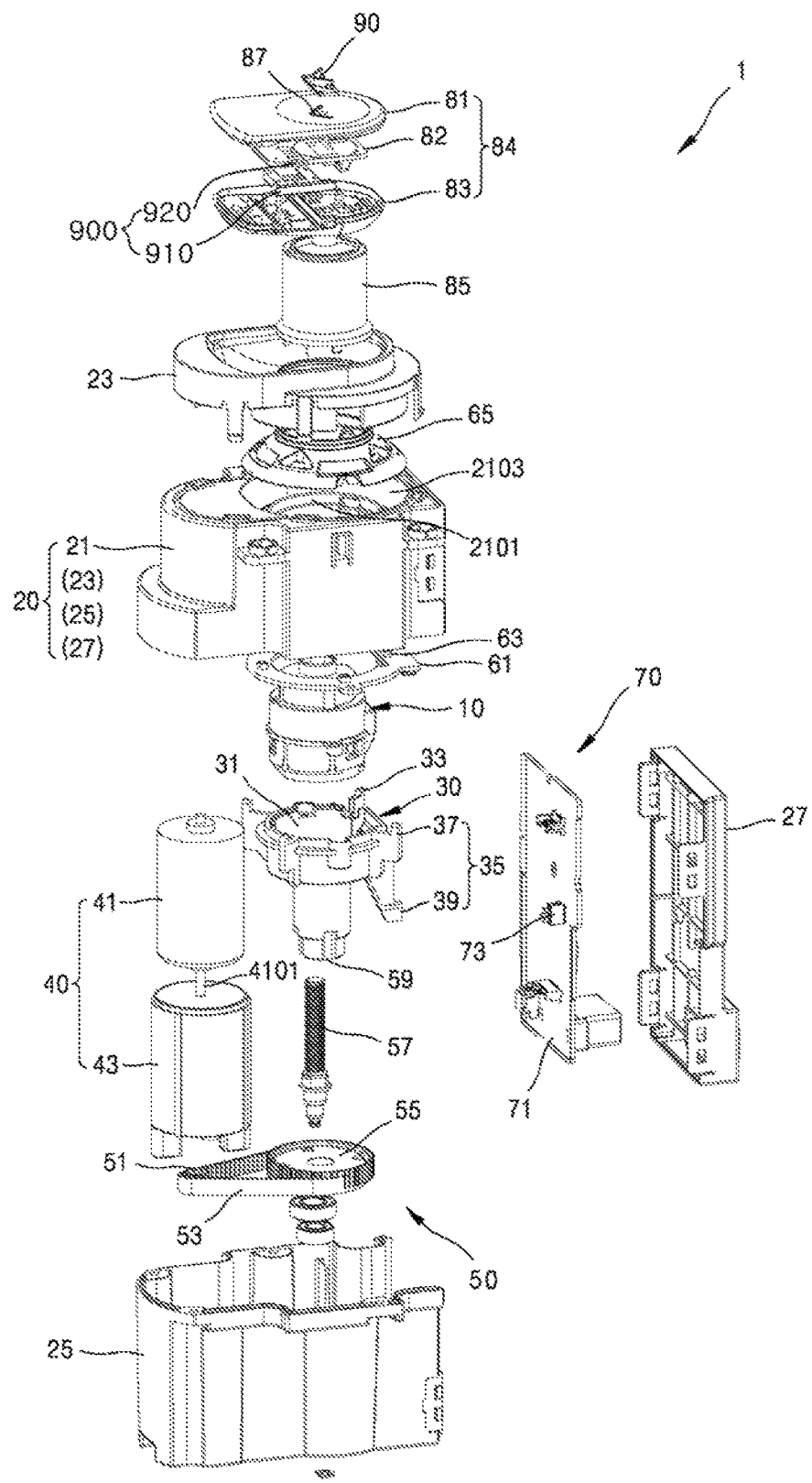
FIG. 2 is a schematic exploded perspective view illustrating an operating module according to one embodiment of the present invention.
Figure 3:
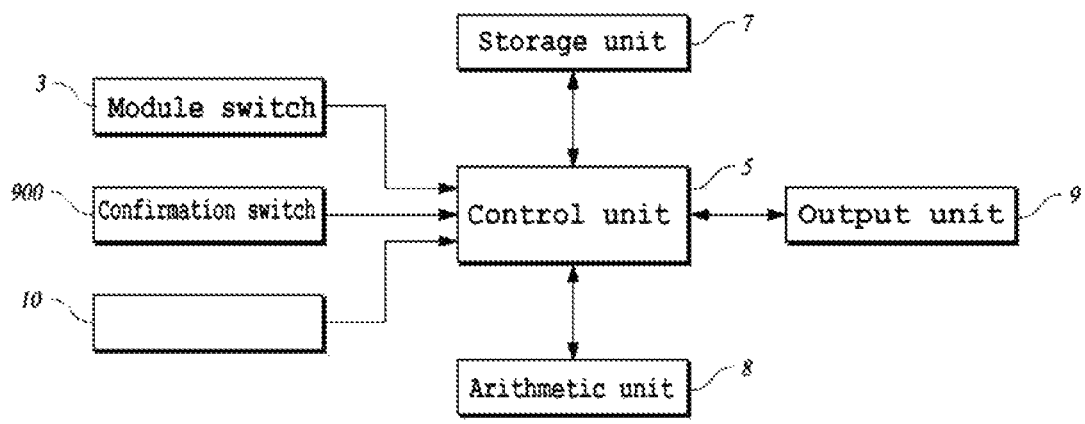
FIG. 3 is a schematic block diagram illustrating a partial configuration and a connection structure between other elements of an operating module according to one embodiment of the present invention.
Figure 4:
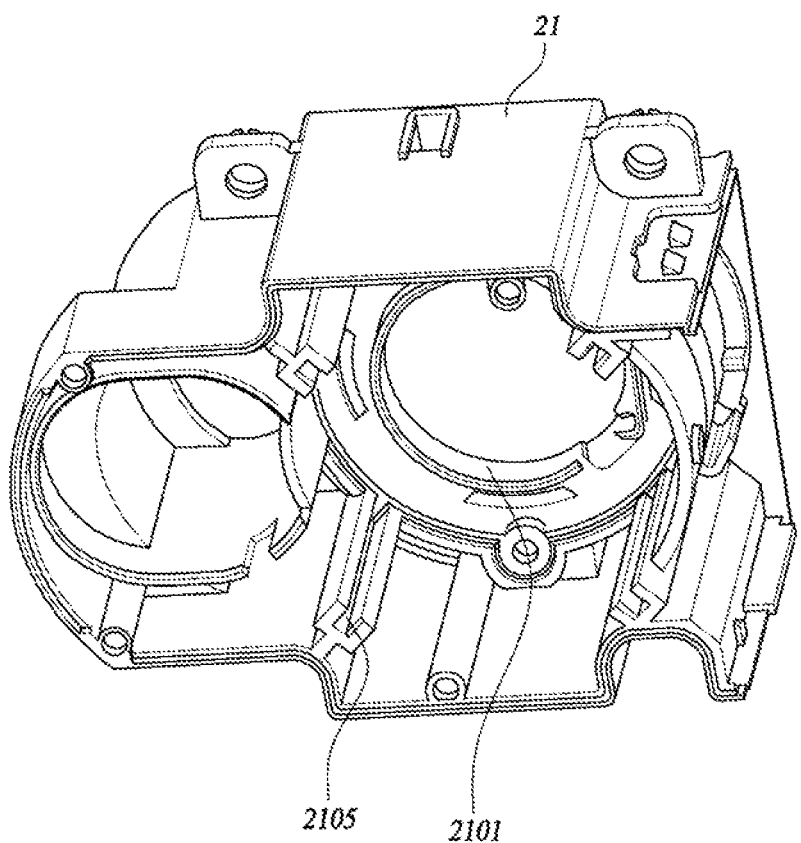
FIG. 4 is a schematic bottom perspective view illustrating a module housing body of an operating module according to one embodiment of the present invention.
Figure 5:
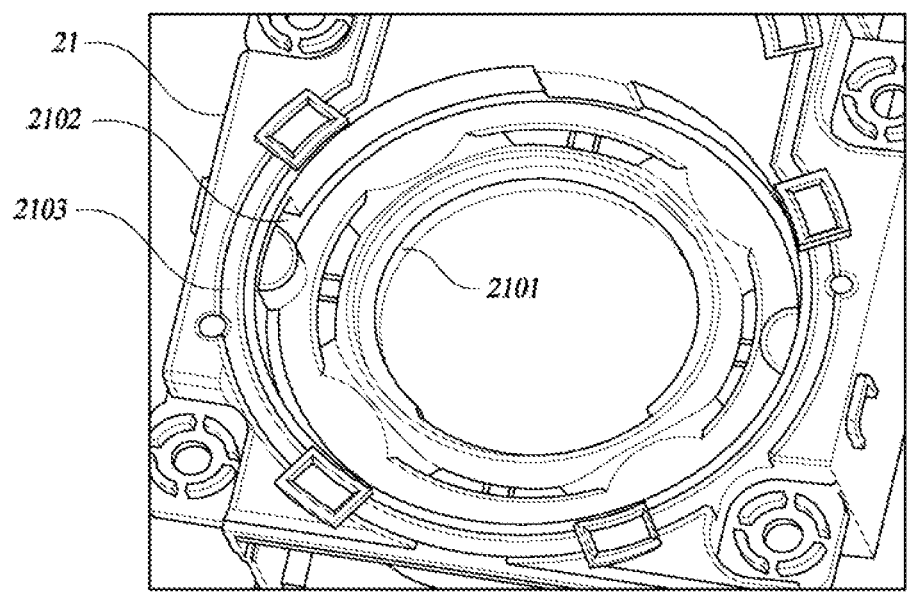
FIG. 5 is a schematic bottom perspective view illustrating a partial configuration of a module housing body of an operating module according to one embodiment of the present invention.
Figure 6:
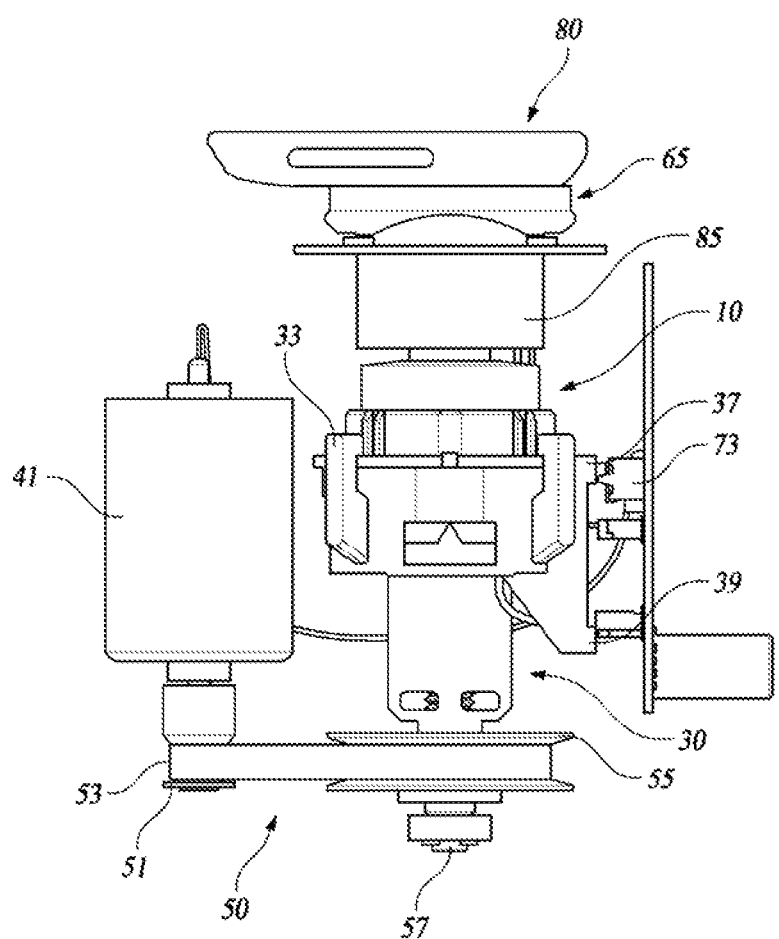
FIGS. 6 and 7 are views illustrating the pop-up operation of an operating module according to one embodiment of the present invention.

FIG. 1 is a perspective view illustrating an operating module according to one embodiment of the present invention, FIG. 2 is a schematic exploded perspective view illustrating an operating module according to one embodiment of the present invention, and FIG. 3 is a schematic block diagram illustrating a partial configuration and a connection structure between other elements of an operating module according to one embodiment of the present invention.

As shown in the drawings, an operating module 1 according to one embodiment of the present invention includes a vehicular multi-operating switch unit 10, a module housing 20, a module drive unit 40, a module unit shuttle 30, and a module drive transfer unit 50.

The module housing 20 allows the vehicular multi-operating switch unit 10 to be movably accommodated therein. The module housing 20 includes a module housing body 21, a module housing cover 23, a module housing base 25, and a module housing side cover 27. The module housing body 21 is interposed between the module housing cover 23 and the module housing base 25. The module housing cover 23 and the module housing base 25 are engaged with each other to define an internal space therebetween so that the vehicular multi-operating switch unit 10 is movably disposed in the internal space.

The module housing cover 23 allows a module optical unit 60 which will be described later to be disposed therein and then the module optical unit 60 is disposed on a top of the module housing body 21 so that the module optical unit 60 can be stably mounted on the module housing body 21. The module housing body 21 includes a module housing body through-opening 2101 formed on the top thereof so as to allow other constituent elements which will described later to pass therethrough. The module housing body 21 includes a module housing body optical seating part 2103 formed on an outer circumference of the module housing body through-opening 2101 so as to allow the module optical unit 60 to be seated thereon. In addition, at an outer gap of the module housing body optical seating part 2103, is formed a module housing body drainage port 2102 that allows foreign substances to be discharge to the outside to prevent the foreign substances from being introduced into the module housing body.

The module drive unit 40 is disposed in the module housing 20 and generates a driving force that moves the vehicular multi-operating switch unit 10. The module drive unit 40 includes a module driver 41 and a module drive housing 43. The module driver 41 is implemented as a motor, and can be fixedly mounted to the module drive housing 43.

The module unit shuttle 30 allows the vehicular multi-operating switch unit 10 to be accommodated therein, and the module unit shuttle is movably disposed in the module housing 20. The module unit shuttle 30 includes a shuttle accommodating part 31 formed at the center thereof so as to allow the vehicular multi-operating switch unit 10 to be accommodated therein. The module unit shuttle 30 is operated by the driving force generated from the module drive unit 40 via the module drive transfer unit 50.

The module drive transfer unit 50 is connected at one side thereof to the module drive unit 40 and connected at the other side thereof to the module unit shuttle 30, and transfers a driving force that moves the vehicular multi-operating switch unit 10 relative to the module housing 20.

The module drive unit 40 is operated in response to a signal from a module switch 3 to ascend or descend the vehicular multi-operating switch unit 10 relative to the module housing 20. In other words, the state switching operation from such an off state to an operation preparing state is implemented as a pop-up/down state switching operation. The pop-up/down state switching operation of the operating module 1 can be performed through the module switch 3 mounted on a steering wheel for a vehicle.

In the meantime, the operating module 1 and the vehicular multi-operating switch unit 10 of the present invention are implemented as separate control devices, but may be implemented as integral control devices. As shown in FIG. 3, a module switch 3, a confirmation switch unit 900, and a vehicular multi-operating switch unit 10 are connected to a control unit 5 so that a detection or input signal can be transferred to the control unit 5. In this case, the control unit 5 may confirm whether or not a limit operation is performed based on an excessive input current signal applied from the module driver 41 of the module drive unit 40 and whether or not a switch knob 80 performs a stable lifting or lowering operation so as to prevent a safety accident.

A signal inputted through the module switch 3, the confirmation switch unit 900 and the vehicular multi-operating switch unit 10 is applied to the control unit 5, and the control unit 5 applies an arithmetic control signal to an arithmetic unit 8 using preset data stored in a storage unit 7 and performs a predetermined arithmetic process, and then applies an output control signal to an output unit 9 to allow an output control signal selected by a driver or the like to be applied to the output unit 9 so that a predetermined vehicle output unit function may be performed.

The module drive transfer unit 50 transfers the driving force generated from the module drive unit 40 to the module unit shuttle 30. The module drive transfer unit 50 includes a module drive pulley 51, a module drive belt 53, a module driven belt 55, a module drive transfer shaft 57, and a module drive transfer shaft-corresponding part 59.

The module drive pulley 51 is connected to a drive shaft 4101 of the module driver 41 of the module drive unit 40 to receive the driving force generated from the module driver 41.

The module driven belt 55 is disposed spaced apart from the module drive pulley 51. The driving force transferred to the module drive pulley 51 is transferred to the module driven belt 55 so that a speed ratio according to the radius ratio between the module drive pulley 51 and the module driven belt 55 can be adjusted. The motor driven pulley is connected to the other side of the module drive belt 53 through a motor drive belt to receive the driving force from the module drive pulley 51.

The module drive belt 53 is connected at one side thereof to the module drive pulley 51 and connected at the other side thereof to the module driven belt 55 to transfer the driving force transferred from the module drive pulley 51 to the module driven belt 55.

The module drive transfer shaft 57 is coaxially connected to the module driven belt 55 to rotate together with the module driven belt 55.

The module drive transfer shaft-corresponding part 59 is disposed at the module unit shuttle 30. Although not shown correctly in the drawing, the module drive transfer shaft-corresponding part 59 is formed as an accommodating hole where the module drive transfer shaft 57 is accommodated at a bottom of the module unit shuttle 30, and may be formed as a structure in which a screw thread is formed on the inner circumference of the module drive transfer shaft-corresponding part 59 so as to be meshed with a screw thread formed on the outer circumference of the module drive transfer shaft 57.

In addition, the module unit shuttle 30 includes a shuttle guide 33 arranged along the outer circumference of a top thereof so as to guide the movement thereof, and the module housing 20 includes a shuttle guide-corresponding part 2105 at a position corresponding to the shuttle guide 33. The shuttle guide 33 of the module unit shuttle 30 and the shuttle guide-corresponding part 2105 of the module housing 20 has a structure in which they are engaged with each other in a relatively movable manner.

By virtue of the engagement structure between the shuttle guide 33 and the shuttle guide-corresponding part 2105, the axial rotation of the module unit shuttle 30 is limited and the module unit shuttle 30 can be moved vertically in the longitudinal direction of the module drive transfer shaft 57.

Figure 7:
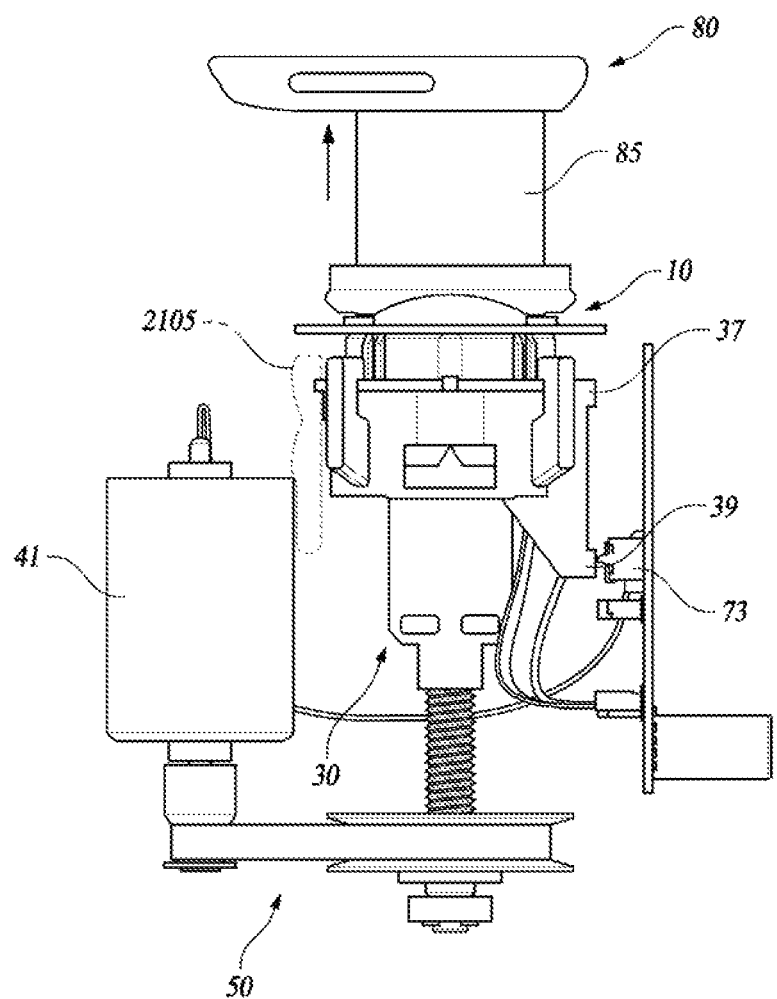
Figure 8:
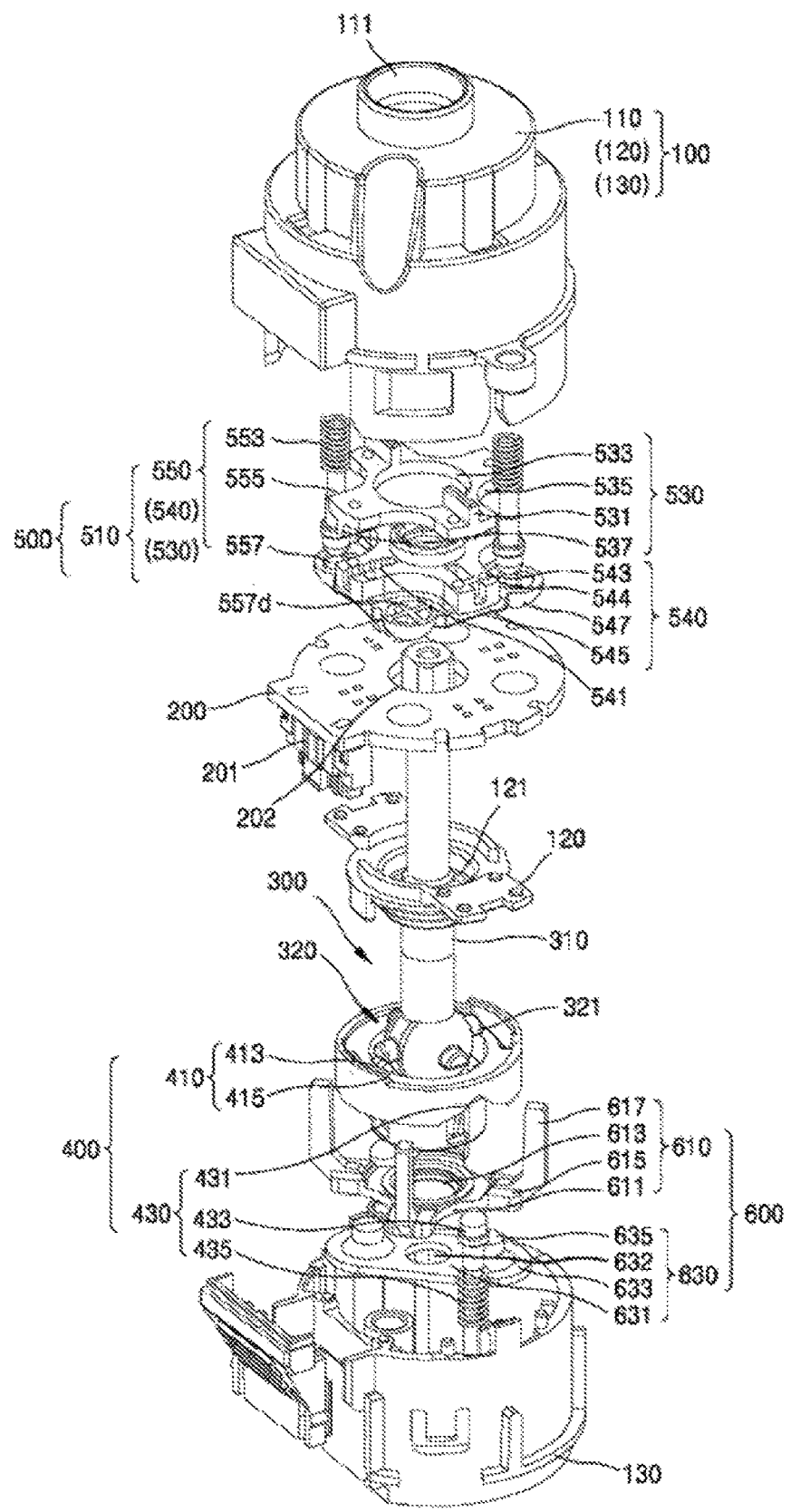
FIG. 8 is an exploded perspective view illustrating a vehicular multi-operating switch unit of an operating module according to one embodiment of the present invention.

In this case, the shuttle guide 33 and the shuttle guide-corresponding part 2105 achieve the stable vertical movement of the module unit shuttle 30, and may form a multiple arrangement structure. The shuttle guide 33 may be equidistantly arranged at multiple points along the outer circumference of the module unit shuttle 30. This multiple equidistantly arranged structure enables to implement a stable vertical lifting/lowering operation of the module unit shuttle 30. As shown in FIGS. 7 and 8, the lifting or lowering operation of the switch knob can be performed through the transfer structure of the module drive transfer unit 50.

In the meantime, the operating module 1 may include a constituent element for solving an impact interference problem due to an excessive lifting and lower operation as well as performing the stable vertical lifting/lower operation of the module unit shuttle 30 in which vehicular multi-operating switch unit 10 is disposed through the module drive unit or the like. In other words, the operating module 1 of the present invention may include a module limiter unit 70 disposed in the module housing 10 and configured to detect a limit position movement of the module unit shuttle 30.

More specifically, the module limiter unit 70 includes a module limiter substrate 71, a module limiter sensor 73, and a module limiter moving part 35.

The module limiter substrate 71 is disposed in the module housing 10. The module limiter substrate 71 can establish an electrical communication with other substrates disposed in the operating module 1.

The module limiter sensor 73 is disposed on the module limiter substrate 71. The module limiter sensor 73 detects whether or not the module unit shuttle 30 reaches a movement limit of a lifting and lowering movement position thereof.

The module limiter moving part 35 is disposed on an outer circumferential portion of the module unit shuttle 30 so as to correspond to the position of the module limiter sensor 73. The module limiter moving part 35 includes an upper limiter moving part 37 and a lower limiter moving part 39. The upper limiter moving part 37 is disposed on a circumferential top portion of a side of the module unit shuttle 30, and the lower limiter moving part 39 is disposed at a lower end of the module unit shuttle 30 so as to be spaced apart from the upper limiter moving part 37. As shown in FIGS. 7 and 8, the interaction between the upper limiter moving part 37 and the lower limiter moving part 39 relative to one module limiter sensor 73 can confirm whether or not the module unit shuttle 30 reaches the limit position of an excessive vertical movement operation thereof. In other words, by virtue of this configuration, one module limiter sensor 73 can confirm whether or not the module unit shuttle 30 reaches the limit position of the vertical movement operation thereof to obtain the effect of saving the manufacturing cost and the like.

Although it has been described in this embodiment that the module limiter sensor 73 detect whether or not the module unit shuttle 30 reaches the limit position of the vertical movement operation thereof, another implementation or a combined implementation through other configurations is possible. In other words, when a current signal of the module driver 41 of the module drive unit 40 that provides a driving force for lifting or lowering the module unit shuttle 30 increases drastically, this state is determined to be an unexpected drastical increase in the driving force due to an external impact or resistance, and the operating module 1 of the present invention may have a structure in which the control unit 5 of the present invention applies a control signal to perform a stop or an operation in an opposite direction.

Alternatively, when other signal, i.e., another switch signal other than a signal associated with an operator module starts, the control unit 5 of the present invention may determine it to be an operation of other device, but not an operation of the operating module and execute a predetermined stop or original position return mode.

The vehicular multi-operating switch unit 10 includes a housing unit 100, a substrate 200, a switch shaft unit 300, a rotary switch unit 400, a directional switch unit 500, a push switch unit 600, and a switch knob 80.

The housing unit 100 is disposed in the module housing 20. A configuration capable of lifting or lower the housing unit 100 may be provided in the module housing 20. The housing unit 100 includes a housing cover 110, a housing holder 120, and a housing base 130. An internal space is defined between the housing cover 110 and the housing base 130. The housing base 130 forms a structure of supporting the substrate 200, and the housing cover 110 is coupled to the housing base 130 to protectively cover the top portion of the housing base 130. The housing cover 110 has a through-hole 111 formed on one side thereof so that one end of the switch shaft unit 300 can be exposed to the outside through the through-hole 111.

The housing holder 120 is disposed between the housing cover 110 and the housing base 130 so that the housing holder 120 can support the substrate 200 together with the housing base 130. The housing holder 120 can divide a space defined by the housing cover 110 and the housing base 130 to perform a space dividing function of preventing the occurrence of interference during the operation of the rotary switch unit 400 and the directional switch unit 500. The housing holder 120 has a through-hole 121 formed at the center thereof so as to allow the switch shaft unit 300 to be inserted thereinto.

The substrate 200 is disposed in the housing unit 100. Various electrical elements may be disposed on the substrate 200. These electrical elements may be electrically connected to each other through a wiring formed on the substrate 200 or may be electrically connected to each other through a separate component such as a flexible substrate or cable. The electrical elements may be disposed on either surface of the substrate 200.

The substrate 200 has a through-hole 202 formed at the center thereof so that the switch shaft unit 300 can be penetratingly disposed therein. A substrate connector 201 is mounted on one end of the substrate 200. An external electrical device such as, for example, the control unit can be electrically connected to the substrate 200 through the substrate connector 201.

The switch shaft unit 300 has a structure in which it is received at one end thereof in the housing unit 100 and exposed at the other end thereof to the outside. The switch shaft unit 300 includes a switch shaft body 310 and a switch shaft hinge 320. The switch shaft body 310 may be implemented as a rod type having a predetermined length. A switch knob 80 for manipulation by a user is coupled to a distal end of the switch shaft body 310, which is exposed to the outside. The switch shaft hinge 320 is disposed at an end of the switch shaft body 310 so as to be disposed in the housing unit 100.

The switch shaft hinge 320 may have a spherical shape or other shapes as shown in the drawing. The switch shaft hinge 320 can form the center of an axial rotation or tilting operation of the switch shaft unit 300. The switch shaft hinge 320 is disposed in a space defined between the housing holder 120 and a rotary block 410 of the rotary switch unit 400. The switch shaft hinge 320 includes a shaft hinge guide 321 formed protrudingly thereon.

The switch shaft unit 300 can perform a combined movement such as an axial rotation movement, a tilting movement centering on the switch shaft hinge 320 by a horizontal pressing force, a downwardly pushing movement, or the like.

The rotary switch unit 400 can detect an axial rotation of the switch shaft unit 300, and transmit a signal indicating the detection of the axial rotation to an external device such as the control unit.

The rotary switch unit 400 is implemented as a direct contact type switch. In other words, the rotary switch unit 400 includes a rotary block 410 and a rotary switch sensor. The rotary block 410 is disposed below the substrate 200.

The rotary block 410 may have a structure capable of at least partially accommodating the switch shaft hinge 310. The rotary block 410 includes a rotary block accommodating guide 413 formed on the inner circumferential surface thereof. The rotary block accommodating guide 413 can be engaged with the shaft hinge guide 321 of the switch shaft hinge 320.

In addition, the rotary block 410 includes a plurality of rotary block moving parts 415 formed at a circumferential end, i.e., a top end thereof, which is oriented toward the substrate 200. The rotary block moving part 415 has a protruded or recessed shape so as to be oriented toward the substrate 200. That is, the rotary block moving part 415 is formed as a stepped structure having a predetermined height. The rotary block moving part 415 can be brought into direct contact with the rotary switch sensor while rotating to operate the rotary switch sensor.

The rotary switch sensor may be disposed on the bottom surface of the substrate 200 to generate an electrical signal in response to the contact with the rotary block moving part 415. When the rotary switch sensor is axially rotated together with the rotary block 410 and the switch shaft body 310, it can be operated by the stepped structure of the rotary block moving part 415. In other words, when the rotary block 410 is rotated by the axial rotation of the switch shaft unit 300, the rotary block moving part 415 is brought into contact with or is separated from the rotary switch sensor so that the on/off state of the rotary switch sensor can be switched.

The rotary block moving part 415 and the rotary switch sensor may be provided in plural numbers along the circumferential direction of the rotary block. In this case, a more accurate rotary operation signal according to the rotation of the rotary block 410 can be implemented.

The rotary switch unit 400 includes a rotary detent part 430 that allows a user to tactily recognize the axial rotation of the switch shaft unit 300 during the operation of the rotary switch unit. The rotary detent part 430 includes a rotary detent 431, a rotary detent elastic means 435, and a rotary detent rod 433.

The rotary detent 431 is disposed on the underside of the rotary block 410, the rotary detent elastic means 435 is elastically supported on the hosing base 130, and the rotary detent rod 433 is elastically supported by the rotary detent elastic means 435 to maintain a continuous contact with the rotary detent. The rotary detent 431 can have a curved profile shape.

The rotary detent 431 of the curved profile type is disposed to abut against the rotary detent rod 433. When an external force is applied to the rotary detent rod 433, the rotary detent rod 433 is brought into close contact with an inclined part of the rotary detent 431, and when the external force is removed, the rotary detent rod 433 is can be slidably moved along the inclined part.

As such, the rotary detent 431 can perform a function of returning the rotation of the switch shaft unit 300 to its original position in addition to a function of providing a simple detenting tactile sensation.

The push switch unit 600 includes a push holder 610, a push switch, and a push return part 630.

The push holder 610 is at least partially disposed below the substrate 200 and is brought into close contact with the switch shaft hinge 320 of the switch shaft unit 300 so that when the switch shaft unit 300 is vertically moved, the push holder 610 is vertically moved together with the switch shaft unit.

The push holder 610 includes a push holder body 611, a push holder side 615, and a push holder moving part 617. The push holder body 611 has a through-hole 613 formed at the center thereof. The push holder side 615 is formed extending outwardly from the push holder body 611. The push holder side 615 supports the push holder moving part 617. The push holder moving part 617 is formed extending upwardly from the push holder side 615 in parallel with a movement direction of the switch shaft unit 310. The push holder moving part 617 can move when the switch shaft unit 300 is vertically moved.

The push switch is disposed on the bottom surface of the substrate 200. When the push holder 610 is changed in position in a vertical direction, the push switch can generates a signal indicating the change in the position of the push holder 610. The push operation stroke of the push switch is designed to be larger than the operation stroke of the rotary switch. As such, an increase in the push operation stroke can prevent the occurrence of a damage or non-operation of the switch due to an excessive or erroneous operation.

The push return part 630 is disposed below the push holder 610 and serves to elastically support the push holder 610. The push return part 630 includes a push return body 631, a push return side 633, and a push return rubber cap 635. The push return body 621 has a through-hole 632 formed at the center thereof. The push return side 633 is formed extending outwardly from an outer circumference of the push return body, and the push return rubber cap 635 is formed protrudingly on one surface of the push return side 633. The push return rubber cap 635 elastically supports the push holder side 615 so that a vertical pressing force applied to the push holder 610 is removed to cause the push holder 610 to return its original position. The push return body 621, the push return side 633, and the push return rubber cap 635 may be modified in various manners, such as being formed integrally with each other, or formed as a mutual engagement structure.

The directional switch unit 500 includes a directional slide part 510, a directional switch, and a directional return part 550.

The directional slide part 510 can be displaced within the housing unit 100 by the tilting directional operation of the switch shaft unit 300. The directional switch 560 is disposed on the substrate 200 and is operated by a change in the position of the directional slide part 510 to generate a signal indicating the change in the position of the directional slide part 510. In addition, the directional return part 550 serves to return the directional slide part 510 and the switch shaft unit 300 to their original positions.

The directional return part 550 includes a return plunger 555, a return elastic part 553, and a return groove 557. The return plunger 555 is movably disposed in the housing unit 100, the return elastic part 553 is supportingly received in the housing unit 100 to elastically support the return plunger 555. The return plunger 555 is supported by the housing unit 110 so that the return plunger 555 can be moved in the axial direction of the switch shaft unit 300. The return groove 557 can maintain a continuous contact with the return plunger 555 to return the return plunger 555 to its original position. The return groove 557 is formed in the directional slide part 510.

The directional slide part 510 includes a directional medium slide 530, a directional bottom slide 540, and a directional top slide (not shown).

The directional medium slide 530 is disposed between the housing base 130 and the housing cover 110 in such a manner that the switch shaft unit 300 penetrates through the direction medium slide.

The directional medium slide 530 has a medium through-hole 533 formed at the center thereof to allow the switch shaft body 310 of the switch shaft unit 300 to penetrate therethrough. The directional medium slide 530 has a medium side 535 formed at a side thereof. The medium side 535 is formed in a shape in which a side of the directional medium slide 530 is removed partially so that an interference with the directional return part 550 can be prevented.

In addition, the directional medium slide 530 has a predetermined plate structure, and includes a medium upper guide 531 and a medium lower guide 537.

The medium upper guide 531 is formed on one surface of the directional medium slide 530 so as to be oriented toward the housing cover 110. The medium lower guide 537 is formed on the other surface of the directional medium slide 530 so as to be oriented toward the housing holder 120.

The directional top slide is integrally formed on an inner surface of the housing cover 110 so as to be oriented toward the directional medium slide 530 and can be engaged with the directional medium slide 530 in a relatively movable manner. In other words, the directional top slide may have a structure in which it is engaged with the medium upper guide 531 of the directional medium slide 530 to guide the directional medium slide 530. Thus, the directional medium slide 530 can be moved in the longitudinal direction of the medium upper guide 531. The medium upper guide 531 and the medium lower guide 537 can be arranged so as to cross each other at 90 degree angles on the same plane when viewed from the top by projection.

The directional bottom slide 540 is disposed between the directional medium slide 530 and the housing base 130.

The directional bottom slide 540 includes a bottom slide body 544 formed therein to allow the switch shaft unit 300 to pass therethrough. A bottom guide 541 is formed on a top surface of the bottom slide body 544. A bottom slide side 547 is formed extending from a side of the bottom slide body 544 so that the return groove 557 can be formed therein. A bottom slide moving part 545 is disposed at a lower portion of the bottom slide body 544 so that the bottom slide moving part 545 can move the directional switch. The bottom slide body 544 may have a bottom slide lug 543 formed on one surface thereof to form a point-contact structure which minimizes a contact area with the directional medium slide 530 disposed on the top surface thereof.

The directional bottom slide 540 can be moved in four directions relative to the substrate 200 when an external force for the directional tilting operation is applied to the switch shaft unit 300. In this case, the bottom slide moving part 545 of the directional bottom slide 540 can move the directional switch.

The bottom slide side 547 may be disposed at each vertex end of the bottom slide body 544. A return dummy groove 557*d* may be formed at at least one of a plurality of the bottom slide sides 547 so as to restrict an insertion of the return plunger 555 into the return groove 557.

The number of the bottom slide sides 547 disposed may be four, and instead of the return groove 557, the return dummy groove 557*d* is disposed at at least one of the bottom slide sides 547 to prevent the return plunger 555 from being inserted into the bottom slide side 547. Thus, it is possible to prevent a problem in that a worker wrongly recognizes the position of the return plunger 555 to cause an erroneous assembly during the manufacture of the operating module.

In the embodiment of the present invention, the operating module 1 achieves a stable structure through a total of four bottom slide sides 547 so that the return dummy groove 557*d* can be disposed only at two bottom slide sides 547 arranged diagonally. By virtue of this structure, the detenting operation of the directional switch unit 500 can be implemented using a minimum number of parts.

A switch knob 80 is provided at an end of the switch shaft unit 300, is moved together with the module unit shuttle 30 in response to the movement of the module unit shuttle 30, and forms a grip for a user. The switch knob 80 is disposed at an end of the vehicular multi-operating switch unit 10. The switch knob 80 includes a knob cover 81 and a knob base 83. The knob cover 81 and the knob base 83 constitute a knob housing 84. The knob housing 84 is coupled to a knob shaft 85. The knob cover 81, the knob base 83, and the knob shaft 85 can be engaged with one another to form an internal space. Other constituent element constituting the switch knob 80 may be additionally disposed in the internal space.

Although not shown in this embodiment, a touch sensor or the like may be disposed, if necessary, so that various recognition functions including operation recognition by a contact of a driver, character recognition by touching, and the like can be further provided.

In addition, the switch knob 80 may further include a confirmation switch unit 900 for confirming operation selection by a user. The confirmation switch unit 900 is disposed at the switch knob 80. In this embodiment, a confirmation switch knob 910 of the confirmation switch unit 900 is disposed at a side of the switch knob 80 in a pressable manner, and a confirmation switch 920 is disposed at a position of the switch knob 80, which corresponds to the confirmation switch knob 910. The confirmation switch 920 is disposed on a knob substrate 82 positioned in the internal space defined between the knob cover 81 and the knob base 83. By virtue of this configuration, when a driver presses the confirmation switch knob 910, the confirmation switch 920 can be operated to generate a predetermined confirmation signal. The confirmation switch 920 may be used to confirm a signal through the pressing operation of the driver, and may be operated as a switch of performing an enter function for setting a non-safety related operating mode of other vehicles, if necessary.

The confirmation switch unit 900 can generate a signal for confirming whether or not an operation selected by the user is performed when the vehicular multi-operating switch unit 10 is operated by manipulation of the switch knob 80 by a user. For example, in performing a function associated with vehicle safety, a function of performing an operating state variation through the vehicular multi-operating switch unit by the driver can be implemented only when a confirmation signal is generated by operating the confirmation switch of the switch knob 80. In other words, in the case where the operating module 1 is implemented as a switch module of performing a vehicle safety-related function, for example, when performing a vehicle driving safety-related function, including lane changing, setting of the spacing between front and rear cars, or the like through an advanced driver assistance system (ADAS) such as a lane departure warning system, a crash prevention system or the like, or an autonomous driving system of a semi-autonomous or autonomous vehicle, the presence of a signal is checked through the confirmation switch unit 900 disposed at the switch knob 80 so that if the signal is present, it is possible to confirm whether the presence of the signal is based on an input to which a manipulation intention of a driver is reflected or an input caused by an unintentional simple contact in the driver's another operation, i.e., a steering wheel manipulation process, thus avoiding the occurrence of safety accidents. Meanwhile, at the switch knob 80, may be provided a knob lighting unit that is configured to allow the driver to visually recognize an operating state or an operating mode. The knob lighting unit 90 displays an operating state including whether or not the switch knob 80 can be operated. The knob lighting unit 90 is disposed in such a manner as to be at least partially exposed to the outside through a through-hole formed on the top surface of the knob cover 81 so that the driver can visually recognize an operating state of the switch knob. Light emitted though the knob lighting unit 90 may be implemented as various colored lights, and thus a function of outputting various colors according to the operating state of the switch knob can be implemented.

Figure 11:
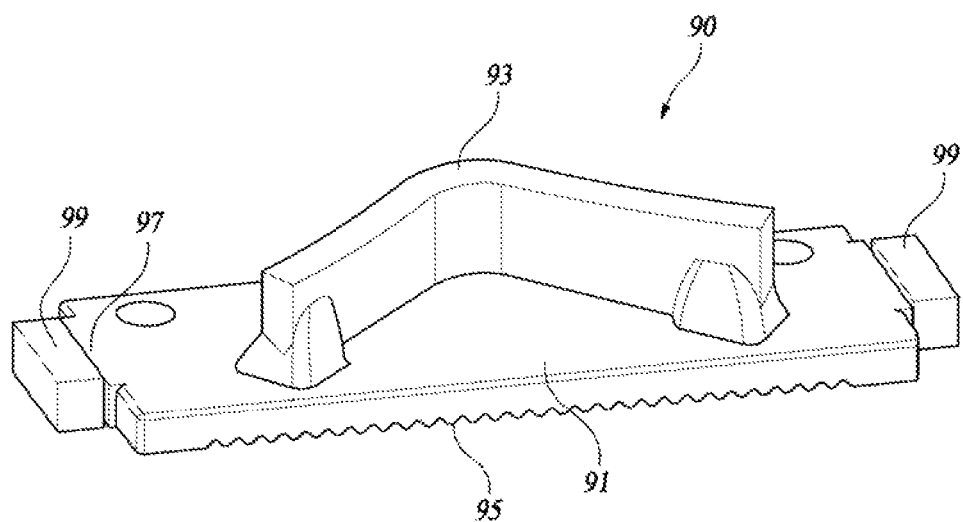
FIGS. 11 and 12 are top and bottom perspective views illustrating a partial configuration of a knob lighting unit of a vehicular multi-operating switch unit of an operating module according to one embodiment of the present invention.
Figure 12:
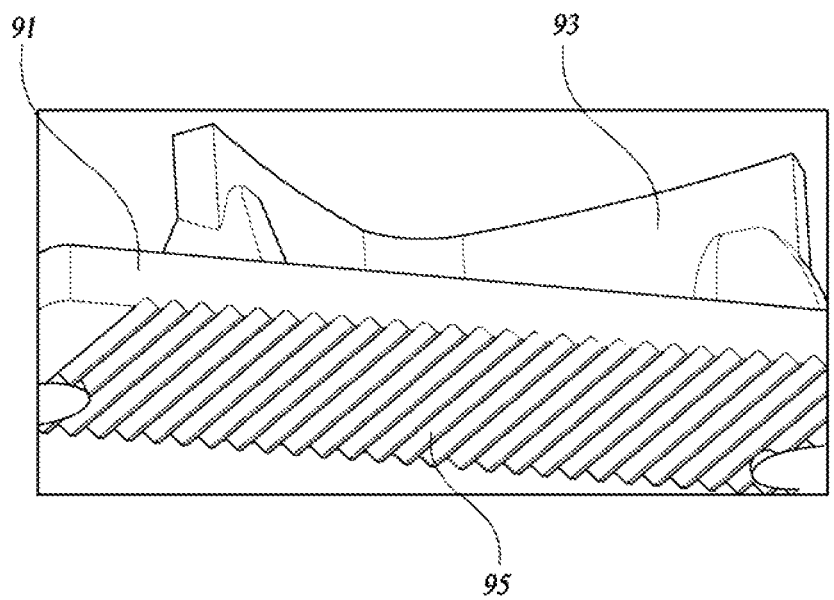

As shown in FIGS. 11 and 12, the knob lighting unit 90 includes a knob lighting element 99 and a knob lighting transfer unit (91, 93, 95 and 97). The knob lighting element 99 is disposed on the knob substrate 200, and the knob lighting transfer unit (91, 93, 95 and 97) transfer light exiting the knob lighting element 99 to the outside.

The knob lighting transfer unit (91, 93, 95 and 97) includes a knob lighting transfer body 91, a knob lighting transfer display part 93, and a knob lighting transfer grating 95. The knob lighting transfer body 91 is disposed in the knob housing 84. The knob lighting transfer body 91 is disposed to penetrate through the knob substrate 82.

The knob lighting transfer display part 93 is disposed on one surface of the knob lighting transfer body 91. The knob lighting transfer display part 93 is exposed to the outside through a knob cover through-hole 87 formed on the knob cover 81.

The knob lighting transfer grating 95 serves to prevent light entering the knob lighting transfer body 91 from exiting the knob lighting transfer body 91 to the outside. The knob lighting transfer grating 95 is formed on the underside of the knob lighting transfer body 91. The knob lighting transfer grating 95 is formed as a predetermined curved and cut portion in this embodiment, but is not limited thereto, and may have a structure in which light entering the inside of the knob lighting transfer body is reflected on the knob lighting transfer grating due to a surface-treated irregular shape of the knob lighting transfer grating to prevent the light from exiting the knob lighting transfer grating 95 and permit the light to exit only the knob lighting transfer display part 93 formed on the top surface of the knob lighting transfer body 91.

In particular, in the embodiment of the present invention, the knob lighting element 99 is disposed at a side of the knob lighting transfer body 91. In this embodiment, the switch knob 80 is based on a slim and compact design so that the knob lighting element 99 disposed on the knob substrate 82 of the switch knob 80 is formed at a side of the knob lighting transfer body 91 to have a structure that permits light to exit the side of the knob lighting transfer body 91. The knob lighting transfer body 91 includes a knob lighting transfer side 97 formed at a side thereof, and the knob lighting transfer side 97 has a structure that permits the incidence of light exiting the knob lighting element 99 thereon.

In the meantime, the optical output function of the present invention is not provided only at the knob lighting unit of the switch knob. The module optical unit 60 may further be provided at the module housing 20 to implement the optical output function. In other words, the module optical unit may be provided at the module housing 20 so as to display an operation state of the switch knob 80, including whether or not the switch knob 80 can be operated.

The module optical unit 60 includes a module optical substrate 61, a module optical element 63, and a module optical transfer part 65.

The module optical substrate 61 is disposed in the module housing 20, and can establish an electrical communication with other substrates.

The module optical element 63 is disposed on surface of the module optical substrate 61.

The module optical transfer part 65 is disposed on surface of the module housing 20 so that an at least partial surface thereof can be exposed to the outside, and is configured to allow light entering the module optical transfer part 65 from the optical element 63 to exit the exposed partial surface of the module optical transfer part 65.

Figure 9:
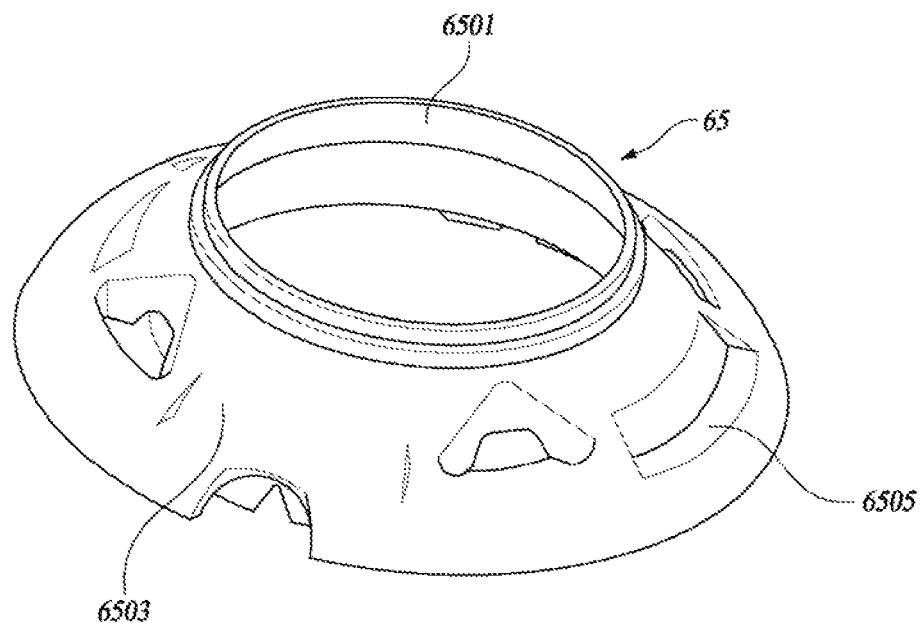
FIG. 9 is a perspective view illustrating a module optical transfer part of a module optical unit of a vehicular multi-operating switch unit of an operating module according to one embodiment of the present invention.
Figure 10:
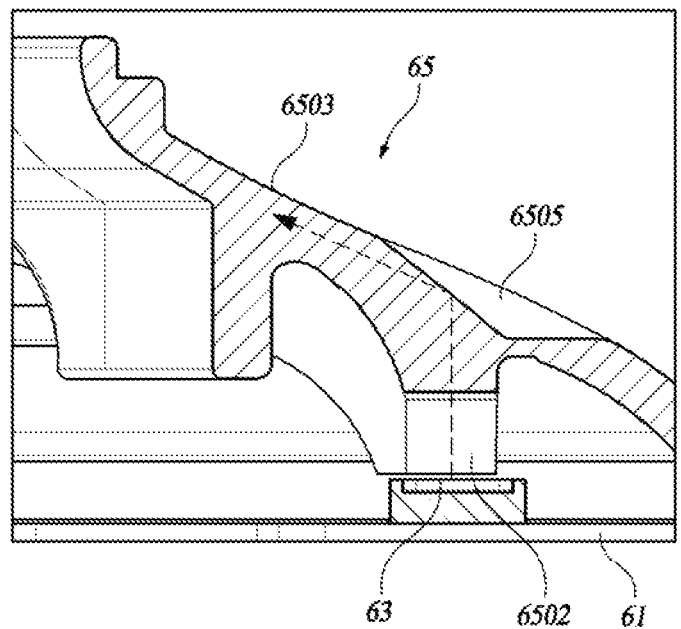
FIG. 10 is a view illustrating a part of a module optical unit of a vehicular multi-operating switch unit of an operating module according to one embodiment of the present invention.

As shown in FIGS. 9 and 10, the module optical transfer part 65 has a module optical transfer through-hole 6501 formed at the center thereof. The switch shaft unit 300 is disposed to penetrate through the module optical transfer through-hole 6501 and can achieve a connection with the switch knob 80.

The module optical transfer part 65 can be implemented in a shape of a cap that includes a module optical transfer inclined part 6503 formed inclinedly on the outer circumference thereof.

The module optical transfer part 65 includes a module optical transfer entering part 6502 and a module optical transfer reflective recess 6505.

The module optical transfer entering part 6502 is formed on a bottom surface of the module optical transfer part 65 and is configured to allow light exiting the module optical element 63 to enter the module optical transfer part 65 through the module optical transfer entering part.

The module optical transfer reflective recess 6505 is formed in a shape of a depression on the module optical transfer inclined part 6503. The module optical transfer reflective recess 6505 is formed at a position corresponding to the module optical transfer entering part 6502 configured to allow light exiting the module optical element 63 to enter the module optical transfer part 65 through the module optical transfer entering part so that an optical path extending from the bottom surface of the module optical transfer part 65 which light enters to a module optical transfer exiting part 6504 formed on a top end of the module optical transfer part 65 via the module optical transfer reflective recess 6505 on which the light is reflected can be optimized to minimize a loss of light, compared to the remaining portions of the module optical transfer inclined part 6503 other than the module optical transfer reflective recess 6505.

Figure 13:
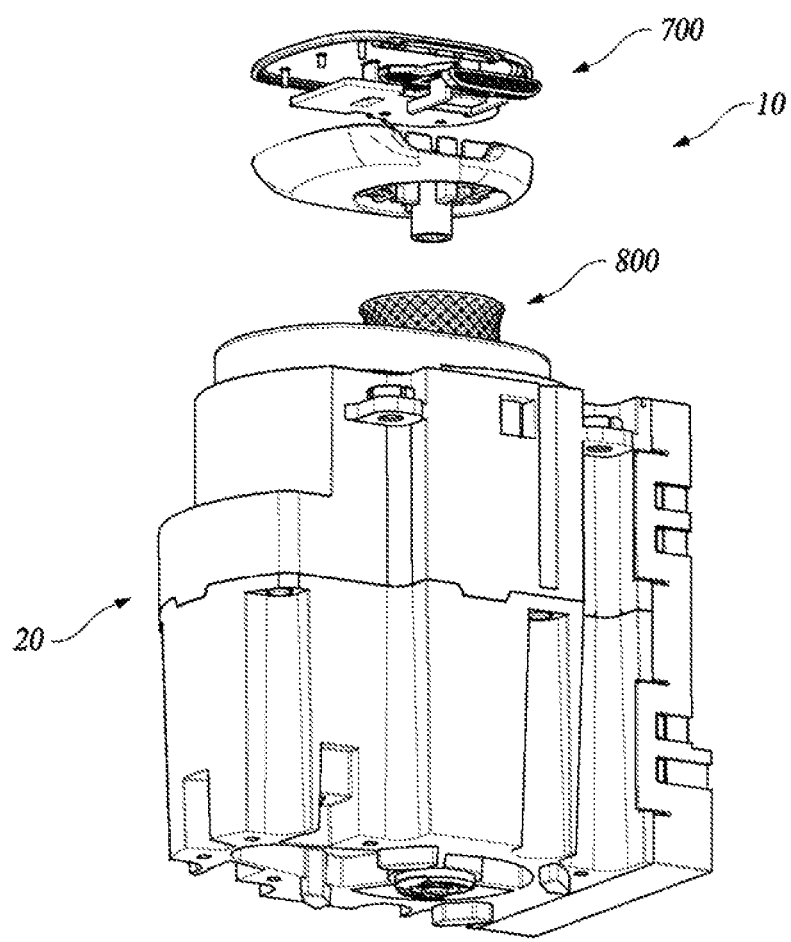
FIG. 13 is a bottom perspective view illustrating a partial configuration of of an operating module according to another embodiment of the present invention.
Figure 14:
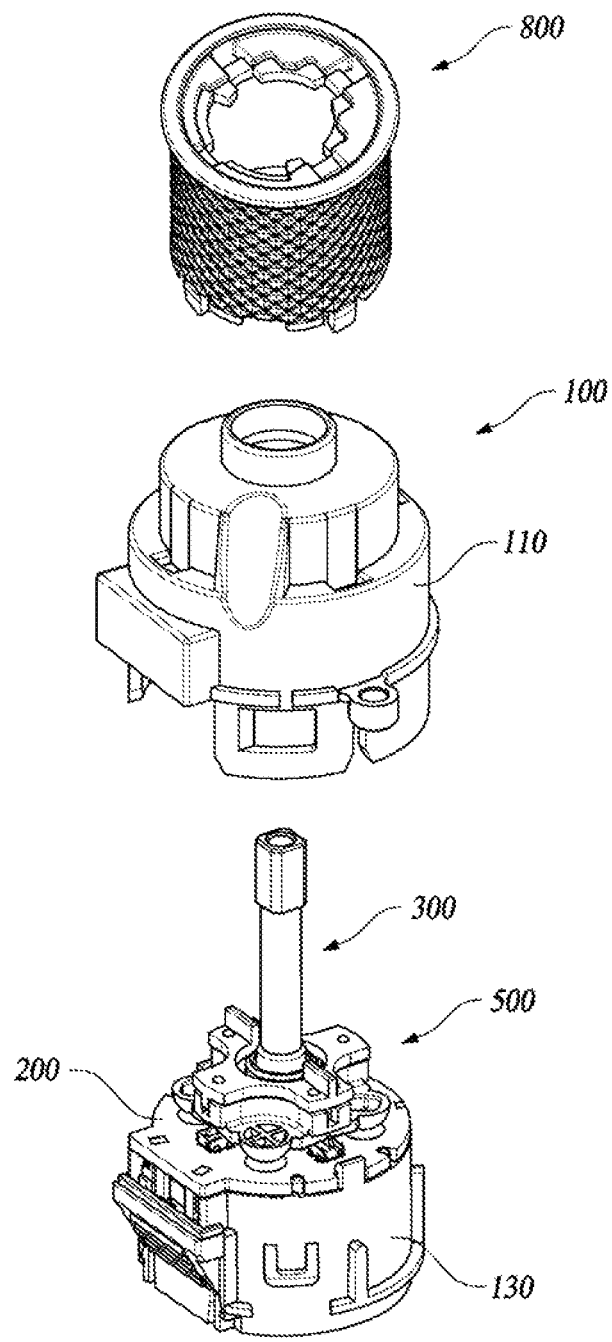
FIG. 14 is an exploded perspective view illustrating the partial configuration of the operating module shown in FIG. 13.
Figure 15:
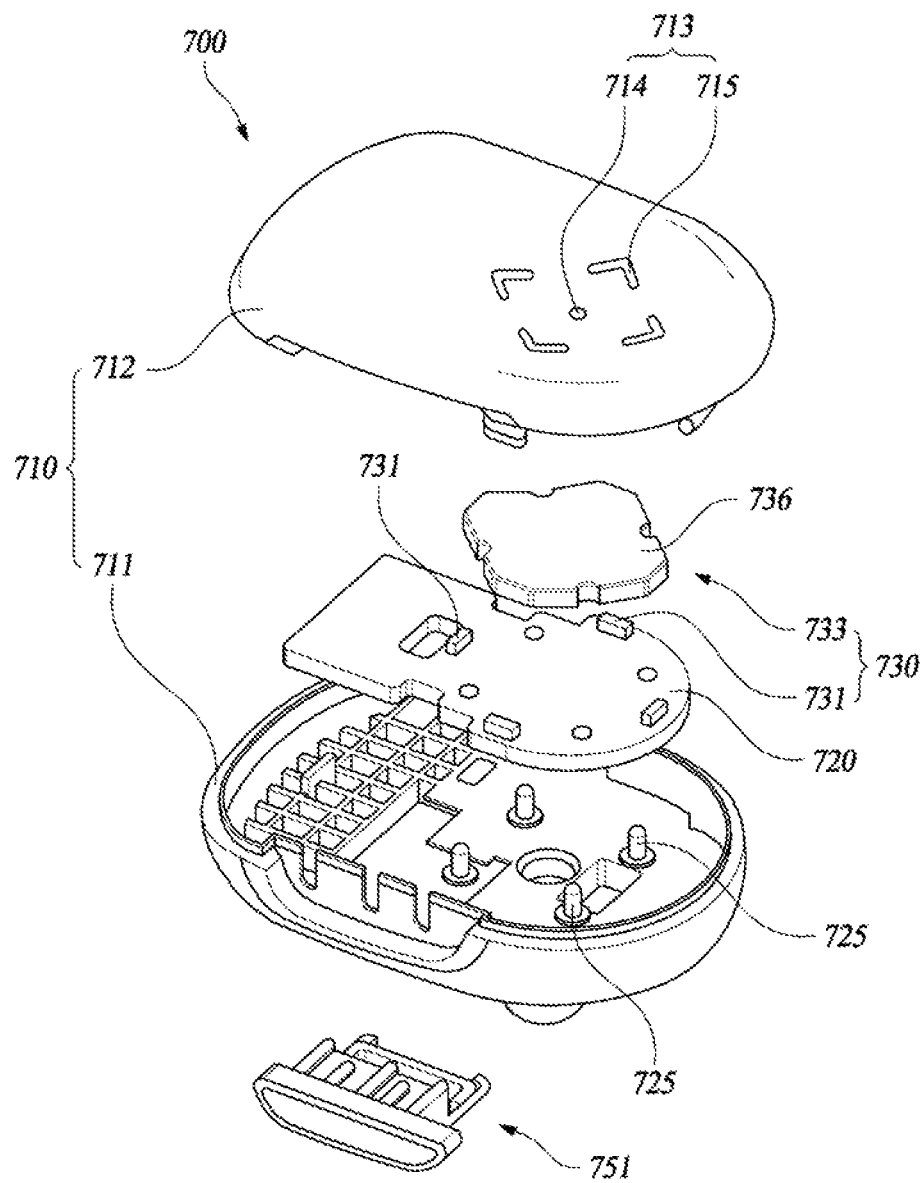
FIG. 15 is a top exploded perspective view illustrating a switch knob of the operating module shown in FIG. 13.
Figure 16:
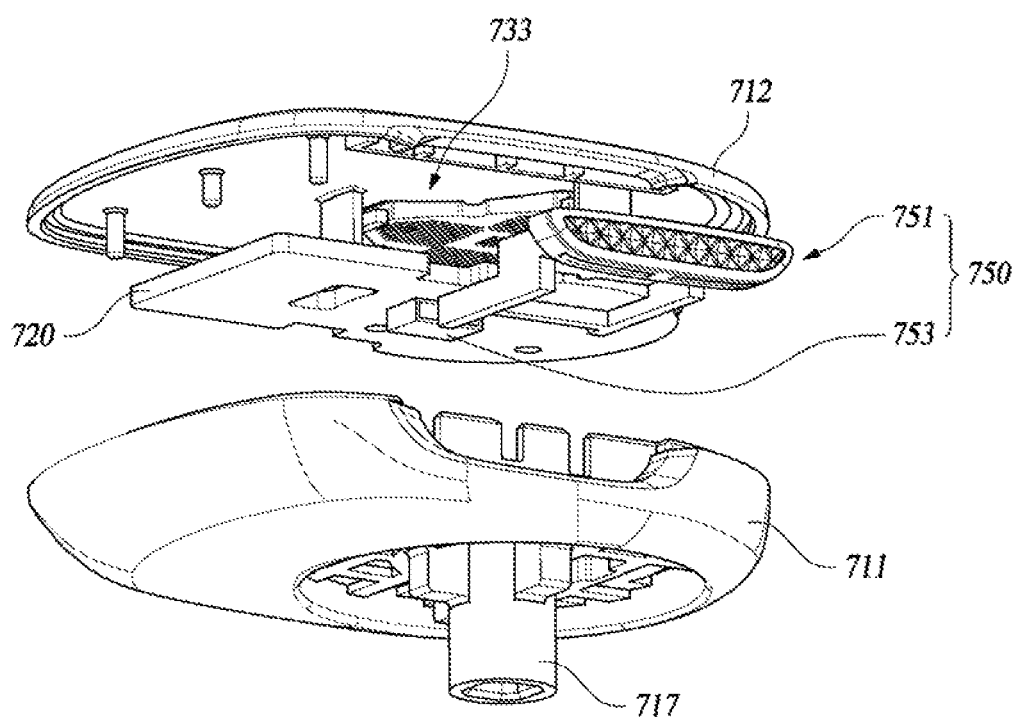
FIG. 16 is a bottom exploded perspective view illustrating a switch knob of the operating module shown in FIG. 13.
Figure 17:
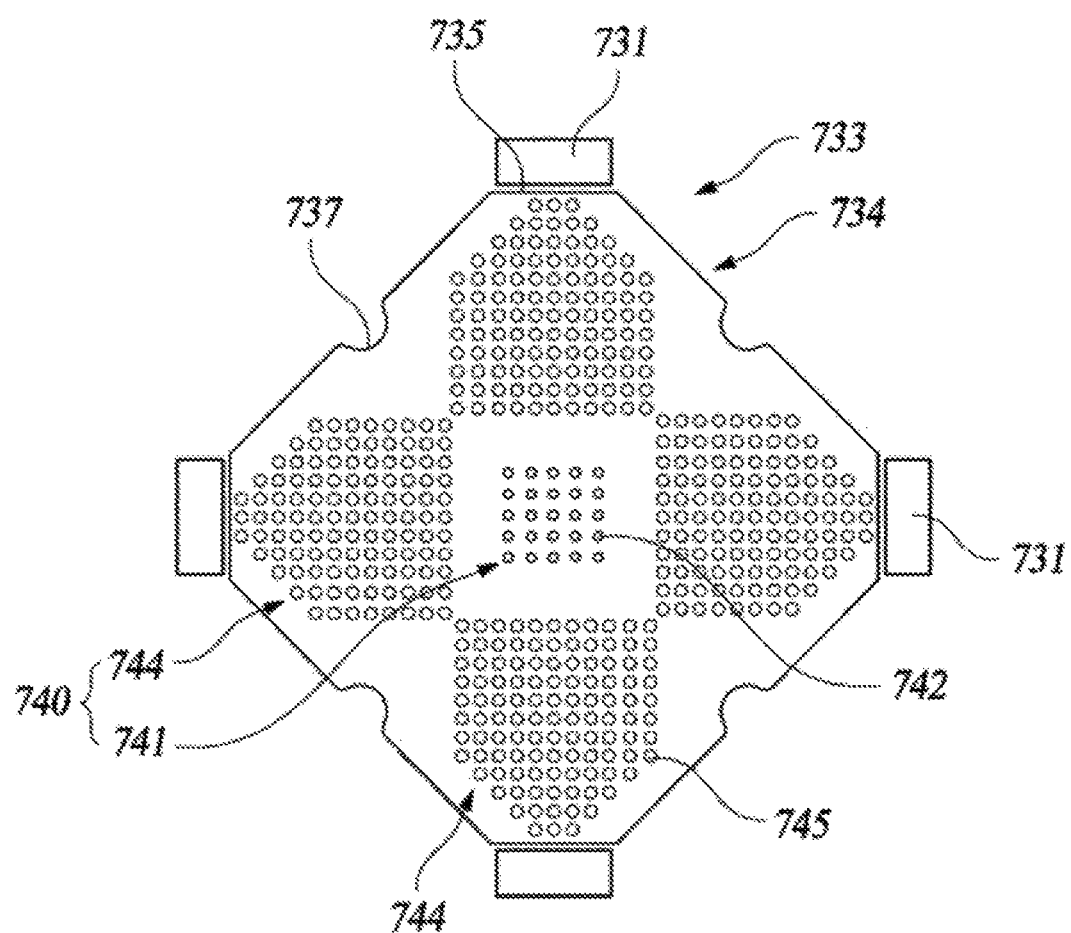
FIG. 17 is a bottom exploded perspective view illustrating a knob lighting unit of the operating module shown in FIG. 13.

In the meantime, FIG. 13 is a bottom perspective view illustrating a partial configuration of an operating module according to another embodiment of the present invention, and FIG. 14 is an exploded perspective view illustrating the partial configuration of the operating module shown in FIG. 13.

An operating module 2 according to another embodiment of the present invention is the same in configuration as the operating module 1 described in the previous embodiment, except that a configuration of the switch knob 700 is partially modified. The operating module 2 can be configured such that the switch knob 700 perform the pop-up operation or is mounted protrudingly outwardly from the module housing 20, similarly to the above-mentioned switch knob 80.

The switch knob 700 is disposed at an outer side of the housing unit 100 and is connected to the switch shaft unit 300. The switch shaft unit 300 is connected at one end thereof to the outer side of the housing unit 100 so as to be connected to the switch knob 700. A knob shaft 85 is disposed between the housing unit 100 and the switch knob 700. The knob shaft 85 is coupled to the housing unit 100 so that it is disposed to at least partially surround the switch shaft unit 300.

The switch knob 700 includes a knob housing 710 coupled to the switch shaft body 310 of the switch shaft unit 300, a knob lighting unit 730 disposed in the knob housing 710, and a confirmation switch unit 750 mounted at a side of the knob housing 710.

The knob housing 710 includes a knob base 711 and a knob cover 712, and is connected to a knob shaft connection part 717. The knob shaft connection part 717 extends downwardly from a lower portion of the knob base 711 so as to be coupled to the switch shaft body 310 of the switch shaft unit 300. The knob cover 712 is coupled to the knob base 711 to protectively cover an upper portion of the knob base 711, and an internal space is provided between the knob base 711 and the knob cover 712 so that other constituent elements can be received therein.

The knob cover 712 includes a knob marking part 713 formed thereon so that light can be transmitted to and from the knob housing 710 through the knob marking part 713. The knob marking part 713 includes a center marking 714 and a plurality of side markings 715 disposed around the center marking 714. Information regarding the operation of the vehicular multi-operating switch unit 10 can be displayed through the knob marking part 713. Although it has been illustrated in the drawings that four side markings 715 are arranged in a point-symmetric manner based on the center marking 714, the knob marking part 713 may be modified in various other forms other than the illustrated structure.

At the inside of the knob housing 710, are disposed a knob substrate 720, a knob support lug 725, and a knob lighting unit 730. An electrode pattern for transmission and reception of an electric power or an electrical signal may be provided on the knob substrate 720. The knob support lug 725 is formed to securely fix a knob lighting guide 733 included in the knob lighting unit 730, and is provided in plural numbers to be protruded upwardly from the knob substrate 720.

The knob lighting unit 730 is disposed in the knob housing 710 so as to irradiate light to the knob marking part 713. The knob lighting unit 730 irradiates light to the knob marking part 713 to increase visibility of the knob marking part 713, and allows various colored lights to exit the knob marking part 713 so that a user can be provided with more various information through the knob marking part 713. In this case, the knob lighting unit 730 can output different colored lights depending on the vehicular multi-operating switch unit 10. The use of the knob lighting unit 730 enables the user to visually recognize information regarding the operating state of the vehicular multi-operating switch unit 10. The knob lighting unit 730 includes a knob light source element 731 and a knob lighting guide 733.

The knob light source element 731 is coupled to the knob substrate 720 to emit light to the knob lighting guide 733. The knob light source element 731 may use various devices capable of emitting light, such as an LED and the like. The knob light source element 731 is provided in plural numbers around the knob lighting guide 733.

The knob lighting guide 733 serves to guide light emitted from the knob light source element 731 to the knob marking part 713. If the area of the knob marking part 713 is large, it is not easy for the knob light source element 731 to uniformly irradiate light to the entire area of the knob marking part 713. Thus, the use of the knob lighting guide 733 can uniformly irradiate light to the knob marking part 713 even through a small number of knob light source elements 731. The knob lighting guide 733 is disposed on the same plane as the knob light source element 731 on the knob substrate 720. The arrangement of the knob lighting guide 733 and the knob light source element 731 on the same plane is relatively advantageous to reduce the entire thickness of the switch knob 700, compared to the vertical arrangement of the knob lighting guide 733 and the knob light source element 731. The knob lighting guide 733 includes a lighting guide body 734 and a lighting guide embossing part 740.

The lighting guide body 734 includes a plurality of lighting guide light entering parts 735 formed at the outer edge thereof so as to confront a plurality of knob light source elements 731. In addition, the lighting guide body 734 includes a lighting guide light exiting part 736 formed on one surface thereof to confront the knob marking part 713 of the knob cover 712. The lighting guide body 734 is formed as a front-to-rear and left-to-right symmetrical structure.

More specifically, the lighting guide body 734 is formed in an octagonal shape having eight sides. The lighting guide light entering part 735 is arranged in plural numbers (e.g., four) in such a manner to be disposed at positions correspondingly respectively to two pairs of sides confronting each other among the eight sides of the lighting guide body 734. The sides on which the lighting guide light entering parts 735 are arranged among the sides of the lighting guide body 734 are shorter than the other remaining sides of the lighting guide body 734. The lighting guide light entering part 735 may be generally formed into a size corresponding to the size of a light exiting part of the knob light source element 731. The lighting guide body 734 includes a plurality of lighting guide fixing grooves 737 formed respectively on sides on which the lighting guide light entering parts 735 are not arranged among the sides of the light guide body 734.

When the knob lighting guide 733 is mounted on the knob substrate 720, a plurality of knob support lugs 725 protruded from one surface of the knob substrate 720 can be at least partially inserted into the plurality of lighting guide fixing grooves 737, respectively. The knob support lugs 725 can be at least partially inserted into the lighting guide fixing grooves 737, respectively, and abut against sides of the lighting guide body 734 to support the lighting guide body 734 to prevent the lighting guide body from being displaced.

The lighting guide embossing part 740 is disposed on the other surface of the lighting guide body 734 so as to reflect light entering the inside of lighting guide body 734 through the lighting guide light entering part 735 to the lighting guide light exiting part 736. The lighting guide embossing part 740 includes a center embossing part 741 disposed on the other surface of the lighting guide body 734 to correspond to the position of the center marking 714 of the knob marking part 713, and a plurality of side embossing parts 744 disposed at an outer periphery of the center of the other surface of the lighting guide body 734 to correspond to the positions of the plurality of side markings 715 of the knob marking part 713.

The side embossing parts 744 are spacedly disposed at an outer periphery of the center of the other surface of the lighting guide body 734. The side embossing parts 744 may be arranged in plural numbers (e.g., four) in a point-symmetric manner based on the center point of weight of the lighting guide body 734 as shown in the drawing. The center embossing part 741 includes a plurality of lighting guide reflective lugs 742 formed protrudingly from the other surface of the lighting guide body 734 in a semi-spherical shape, and each the side embossing parts 744 includes a plurality of lighting guide reflective lugs 745 formed protrudingly from the other surface of the lighting guide body 734 in a semi-spherical shape. The lighting guide reflective lugs 742 of the center embossing part 741 serve to reflect light moving along the inside of the lighting guide body 734 to the center marking 714, and the lighting guide reflective lugs 745 of the side embossing parts 744 serve to reflect light moving along the inside of the lighting guide body 734 to the side markings 715. The area of the center embossing part 741 is larger than that of the center marking 714, and the areas of the side embossing parts 744 are larger than those of the side markings 715. The lighting guide reflective lugs 742 and 745 may be modified in various different shapes other than the semi-spherical shape.

Figure 18:
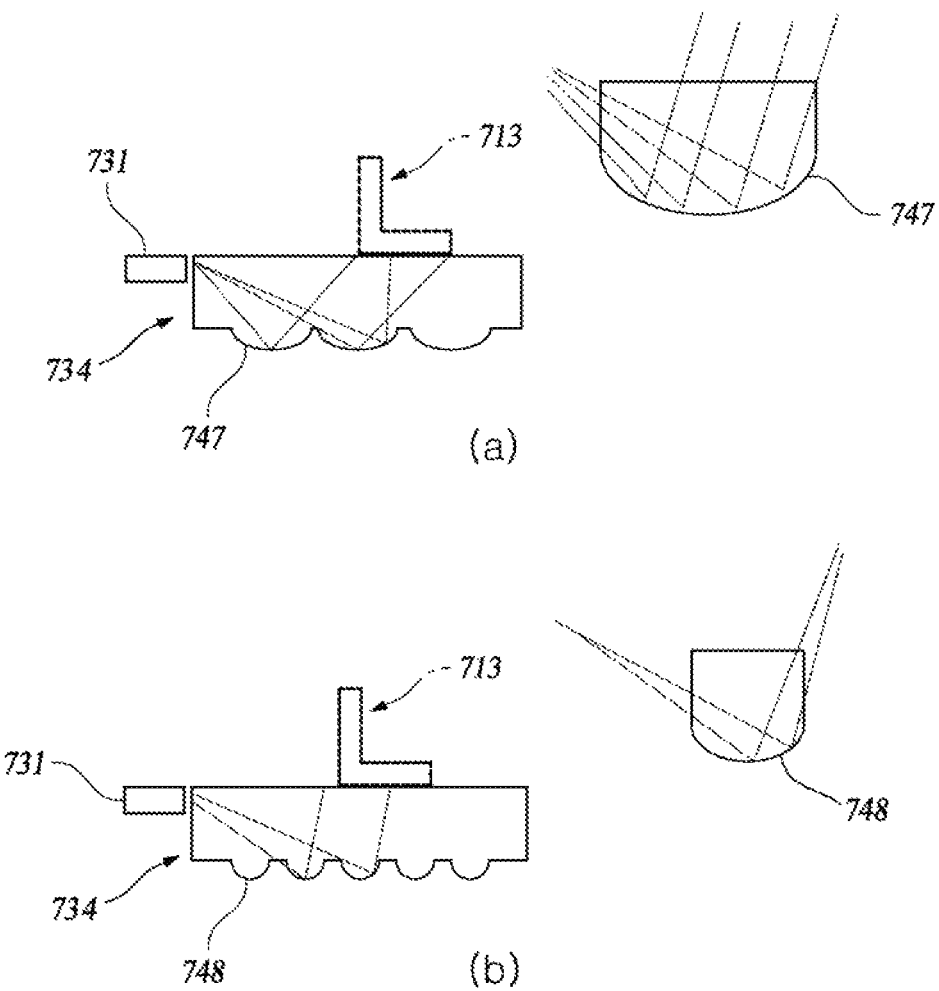
FIG. 18 shows the operation of the knob lighting unit shown in FIG. 17.

As shown in FIG. 18, the amount of light reflected from the knob marking part 713 varies depending on the sizes of the lighting guide reflective lugs protruded from the other surface of the lighting guide body 734. In other words, as shown in FIG. 18(a), if the size of the lighting guide reflective lug 747 is larger, the amount of light reflected from the lighting guide reflective lug 747 to the knob marking part 713 will be relatively large. On the contrary, as shown in FIG. 18(b), if the size of the lighting guide reflective lug 748 is smaller, the amount of light reflected from the lighting guide reflective lug 748 to the knob marking part 713 will be relatively small. If the amount of light reflected to the knob marking part 713 is large, a shadow is apt to occur in the knob marking part 713. Thus, the knob marking part 713 can irradiate light so as not to allow a shadow to occur therein by properly designing the size and arrangement structure of the lighting guide reflective lug.

The diameter of the lighting guide reflective lug 742 of the center embossing part 741 is smaller than that of the lighting guide reflective lug 745 of the side embossing part 744. In addition, the spacing between the lighting guide reflective lugs 742 of the center embossing part 741 is larger than that between the lighting guide reflective lugs 745 of the side embossing part 744. The center embossing part 741 is located at the position where light irradiated from the plurality of knob light source elements 731 is concentrated, and thus the diameters of the lighting guide reflective lugs 742 provided on the center embossing part 741 are made to be relatively small and the spacing between the lighting guide reflective lugs 742 are made to be relatively large so that the brightness of the center marking 714 can be adjusted to the brightness of the side markings 715.

The knob lighting unit 730 has been shown in the drawings, but is not limited thereto. In other words, the number of the knob light source elements 731, the shape of the lighting guide body 734, or the structure of the lighting guide embossing part 740 may be modified depending on the structure of the knob marking part 713. For example, although it has been shown in the drawings that the lighting guide body 734 is formed in an octagonal shape, it may be modified in various different shapes other than the octagonal shape. In addition, although it has been shown in the drawings that the center embossing part 741 is formed in a square shape and the side embossing part 744 is substantially formed in a hexagonal shape, the shape or number of the center embossing part(s) 741 or the side embossing part(s) 744 may be modified in various manners.

Figure 19:
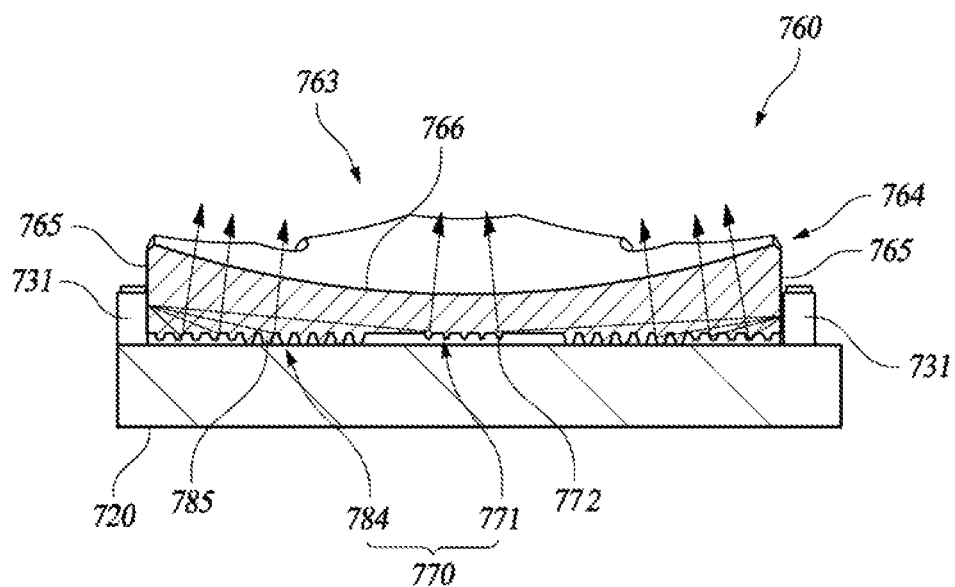
FIG. 19 is a side cross-sectional view illustrating a modification of a knob lighting unit.

Meanwhile, FIG. 19 is a side cross-sectional view illustrating a modification of a knob lighting unit.

A knob lighting unit 760 as shown in FIG. 19 includes a knob light source element 731 and a knob lighting guide 763. The configuration of the knob light source element 731 is the same as that described above.

The knob lighting guide 763 includes a lighting guide body 764 and a lighting guide embossing part 770. The lighting guide body 764 includes a plurality of lighting guide light entering parts 765 formed at the outer edge thereof so as to confront a plurality of knob light source elements 731. In addition, the lighting guide body 764 includes a lighting guide light exiting part 766 formed on one surface thereof to confront the knob marking part 713 of the knob cover 712. The lighting guide light exiting part 766 is formed in a concaved shape. The lighting guide embossing part 770 includes a center embossing part 771 and a plurality of side embossing parts 784 spacedly disposed at the outer periphery of the center embossing part 771. The center embossing part 771 includes a plurality of lighting guide reflective lugs 772 formed protrudingly from the other surface of the lighting guide body 764 in a semi-spherical shape, and each of the side embossing parts 784 includes a plurality of lighting guide reflective lugs 785 formed protrudingly from the other surface of the lighting guide body 764 in a semi-spherical shape.

Figure 20:
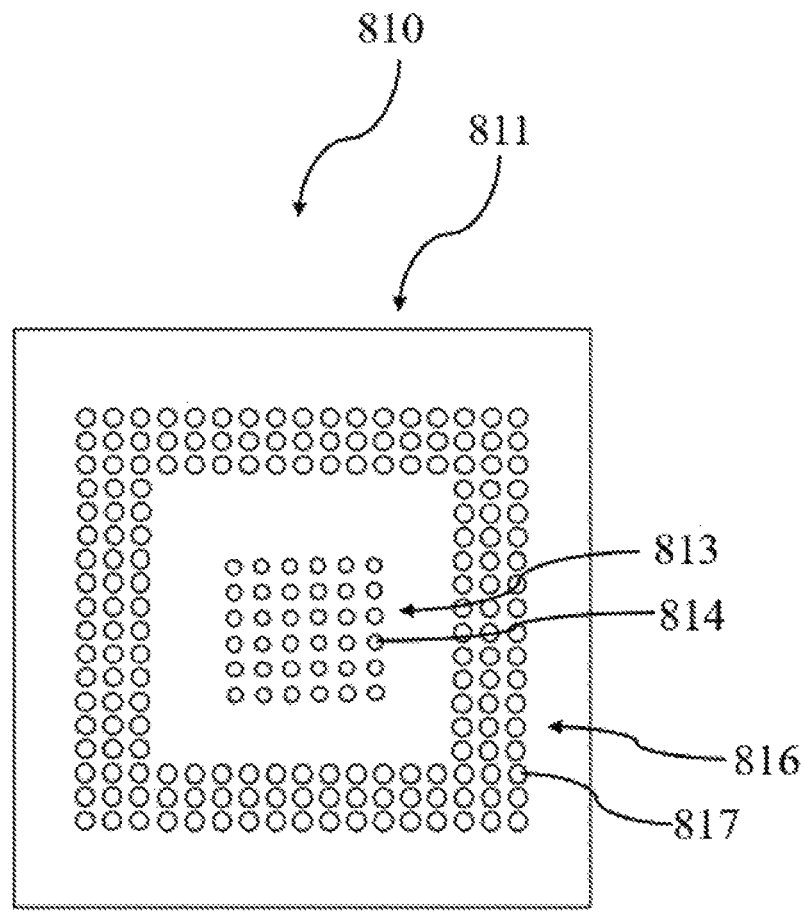
FIGS. 20 and 21 are views illustrating modifications of a knob lighting guide.
Figure 21:
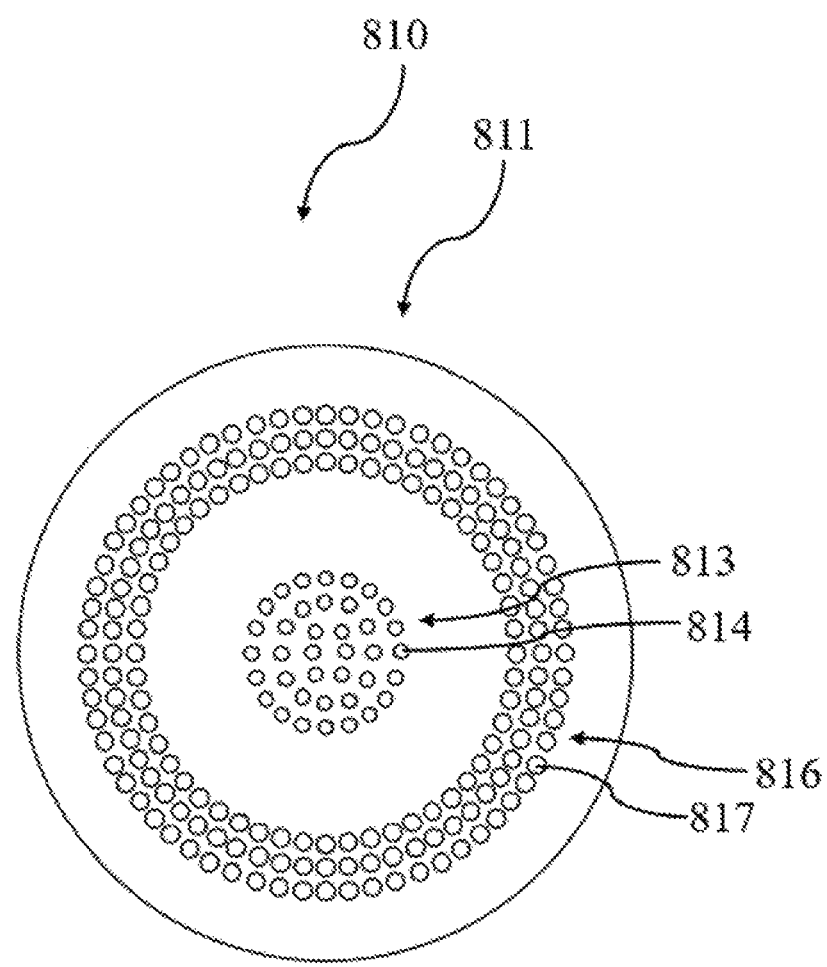

Meanwhile, FIGS. 20 and 21 are views illustrating modifications of a knob lighting guide.

First, a knob lighting guide 810 as shown in FIG. 20 includes a lighting guide body 811, a center embossing part 813 disposed on the other surface of the lighting guide body 811, and a side embossing part 816 disposed at the other periphery of the center embossing part 813 so as to be spaced apart from the center embossing part 813. The lighting guide body 811 includes a lighting guide light entering part formed at the outer edge thereof, and a lighting guide light exiting part formed on one surface thereof. The center embossing part 813 includes a plurality of lighting guide reflective lugs 814 formed protrudingly from the other surface of the lighting guide body 811 in a semi-spherical shape, and the side embossing part 816 includes a plurality of lighting guide reflective lugs 817 formed protrudingly from the other surface of the lighting guide body 811 in a semi-spherical shape. The lighting guide body 811 is formed in a square shape, and the side embossing part 816 is formed in a square ring shape that surrounds the center embossing part 813.

A knob lighting guide 820 as shown in FIG. 21 includes a lighting guide body 821, a center embossing part 823 disposed on the other surface of the lighting guide body 821, and a side embossing part 826 disposed at the other periphery of the center embossing part 823 so as to be spaced apart from the center embossing part 823. The lighting guide body 821 includes a lighting guide light entering part formed at the outer edge thereof, and a lighting guide light exiting part formed on one surface thereof. The center embossing part 823 includes a plurality of lighting guide reflective lugs 824 formed protrudingly from the other surface of the lighting guide body 821 in a semi-spherical shape, and the side embossing part 826 includes a plurality of lighting guide reflective lugs 827 formed protrudingly from the other surface of the lighting guide body 821 in a semi-spherical shape. The lighting guide body 821 is formed in a circular shape, and the side embossing part 826 is formed in a circular ring shape that surrounds the center embossing part 823.

As such, the center embossing part or the side embossing part of the knob lighting guide may have various shapes, and the number of the center embossing parts or the side embossing parts may also be modified in various manners.

Besides, the knob lighting unit may be modified into various different manners in which the lighting guide light exiting part can be formed in various shapes including a planar, concave, convex shape to variously change an optical path.

The confirmation switch unit 750 includes a confirmation switch knob 751 disposed at a side of the knob housing 710 so as to be operated in a pressable manner, and a confirmation switch 753 disposed in the knob housing 710. The confirmation switch 753 is mounted on the knob substrate 720 so that the confirmation switch can be operated in response to the movement of the confirmation switch knob 751 to generate an electrical signal. The confirmation switch unit 750 can be used for the purpose for confirming operation selection by a user or for various different purposes for manipulating a vehicle. When the confirmation switch unit 750 is manipulated, the knob lighting unit 730 can be controlled to display the information related to the manipulation of the confirmation switch unit 750.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical sprit of the appended claims.

The invention claimed is:

1. A switch knob comprising:
    a knob housing including a knob marking part formed thereon so that light is transmitted to and from the knob housing through the knob marking part;
    a confirmation switch unit including a confirmation switch knob disposed at a side of the knob housing so as to be operated in a pressable manner, and a confirmation switch disposed in the knob housing so that the confirmation switch is operated in response to the movement of the confirmation switch knob to generate an electrical signal; and
    a knob lighting unit disposed in the knob housing so as to irradiate light to the knob marking part, wherein an operation of the knob lighting unit is controlled depending on an operation of the confirmation switch unit,
    wherein the knob lighting unit comprises a knob light source element configured to emit light, and a knob lighting guide configured to guide the light emitted from the knob light source element to the knob marking part,
    wherein the knob lighting guide comprises:
    a lighting guide body including a lighting guide light entering part formed at an outer edge thereof so as to confront the knob light source element; and a lighting guide light exiting part formed on one surface thereof so as to confront the knob marking part; and
    a lighting guide embossing part including one or more lighting guide reflective lugs formed protrudingly outwardly from the other surface of the lighting guide body so as to reflect light entering an inside of lighting guide body through the lighting guide light entering part to the lighting guide light exiting part.

2. The switch knob according to claim 1, wherein the lighting guide embossing part comprises one or more side embossing parts disposed at an outer periphery of a center of the other surface of the lighting guide body.

3. The switch knob according to claim 2, wherein the knob marking part comprises one or more side markings disposed at positions corresponding to the side embossing parts, and
    wherein an area of the side embossing part is larger than that of the side marking.

4. The switch knob according to claim 3, wherein the knob marking part comprises a center marking disposed at the center of the side markings to correspond to a center of the lighting guide body,
    wherein the lighting guide embossing part comprises a center embossing part disposed the center of the other surface of the lighting guide body to correspond to a center marking, and
    wherein the area of the center embossing part is larger than that of the center marking.

5. The switch knob according to claim 4, wherein a diameter of the lighting guide reflective lug of the center embossing part is smaller than that of the lighting guide reflective lug of the side embossing part.

6. The switch knob according to claim 5, wherein a spacing between the lighting guide reflective lugs of the center embossing part is larger than that between the lighting guide reflective lugs of the side embossing part.

7. The switch knob according to claim 2, wherein the lighting guide light entering part is arranged in plural numbers along the outer edge of the lighting guide body, and
    wherein the knob light source element is arranged in plural numbers so as to confront the plurality of lighting guide light entering parts.

8. The switch knob according to claim 2, wherein the lighting guide body is formed as a symmetrical structure, and the side embossing part is arranged in plural numbers in a point-symmetric manner based on a center point of weight of the lighting guide body.

9. A switch knob comprising:
a knob housing including a knob marking part formed thereon so that light is transmitted to and from the knob housing through the knob marking part; and
a knob lighting unit disposed in the knob housing so as to irradiate light to the knob marking part,
wherein the knob lighting unit comprises a knob light source element configured to emit light, and a knob lighting guide configured to guide the light emitted from the knob light source element to the knob marking part,
wherein the knob lighting guide comprises:
a lighting guide body including a lighting guide light entering part formed at an outer edge thereof so as to confront the knob light source element; and a lighting guide light exiting part formed on one surface thereof so as to confront the knob marking part; and
a lighting guide embossing part including one or more lighting guide reflective lugs formed protrudingly outwardly from the other surface of the lighting guide body so as to reflect light entering an inside of lighting guide body through the lighting guide light entering part to the lighting guide light exiting part,
wherein the lighting guide embossing part comprises one or more side embossing parts disposed at an outer periphery of a center of the other surface of the lighting guide body,
wherein the lighting guide body is formed as a symmetrical structure, and the side embossing part is arranged in plural numbers in a point-symmetric manner based on a center point of weight of the lighting guide body, the lighting guide body formed in an octagonal shape having eight sides, and the lighting guide light entering part arranged in plural numbers in such a manner to be disposed at positions corresponding respectively to two pairs of sides confronting each other among the eight sides of the lighting guide body,
wherein sides on which the lighting guide light entering parts are arranged among the sides of the lighting guide body are shorter than the other remaining sides of the lighting guide body.

10. The switch knob according to claim 9, wherein the lighting guide body comprises one or more lighting guide fixing grooves formed respectively on the sides on which the lighting guide light entering parts are not arranged among the sides of the light guide body, and
wherein a plurality of knob support lugs is disposed in the knob housing so as to be at least partially inserted into the plurality of lighting guide fixing grooves, respectively, to support the lighting guide body to prevent the lighting guide body from being displaced.

11. The switch knob according to claim 1, wherein the lighting guide light exiting part is formed in a concaved shape.

12. An operating module comprising:
a vehicular multi-operating switch unit comprising a housing unit, a substrate disposed in the housing unit, a switch shaft unit disposed movably so as to be received at one end thereof in the housing unit and exposed at the other end thereof to an outside of the housing unit, a rotary switch unit configured to detect an axial rotation of the switch shaft unit and output a signal indicating a detection of the axial rotation, a directional switch unit configured to detect a tilting directional operation of the switch shaft unit and output a signal indicating a detection of the tilting directional operation, and a push switch unit configured to detect a pressure type push operation of the switch shaft unit and output a signal indicating a detection of the pressure type push operation;
a module housing configured to allow the vehicular multi-operating switch unit to be movably accommodated therein;
a module drive unit disposed in the module housing and configured to generate a driving force that moves the module housing;
a module unit shuttle configured to allow the vehicular multi-operating switch unit to be accommodated therein, the module unit shuttle being movably disposed in the module housing; and
a module drive transfer unit connected at one side thereof to the module drive unit and connected at the other side thereof to the module unit shuttle, and configured to transfer a driving force that moves the vehicular multi-operating switch unit relative to the module housing,
wherein a switch knob is provided at an end of the switch shaft unit, is moved together with the module unit shuttle in response to a movement of the module unit shuttle, and forms a grip for a user, and
wherein a module optical unit is provided at the module housing and is configured to display an operation state of the switch knob, including whether or not the switch knob is operated.

13. The operating module according to claim 12, wherein the module optical unit comprises:
a module optical substrate disposed in the module housing;
a module optical element disposed on one surface of the module optical substrate; and
a module optical transfer part disposed on one surface of the module housing so that an at least partial surface thereof is exposed to an outside, and configured to allow light entering the module optical transfer part from the optical element to exit the exposed partial surface of the module optical transfer part.

14. The operating module according to claim 13, wherein the module optical transfer part is implemented in a shape of a cap that has a module optical transfer through-hole formed at a center thereof and includes a module optical transfer inclined part formed inclinedly on an outer circumference thereof, and
wherein the module optical transfer part comprises:
a module optical transfer entering part formed on a bottom surface thereof and configured to allow light exiting the module optical element to enter the module optical transfer part through the module optical transfer entering part; and
a module optical transfer reflective recess formed in a shape of a depression on the module optical transfer inclined part and configured to reflect the light entering the module optical transfer part through the module optical transfer entering part and transfer the entering light to a top end of the module optical transfer part.

15. The operating module according to claim 12, wherein the module drive unit is operated in response to a signal from a module switch to lift or lower the vehicular multi-operating switch unit relative to the module housing.

16. The operating module according to claim 15, comprising a module limiter unit disposed in the module housing and configured to detect a limit position movement of the module unit shuttle.

17. The operating module according to claim 16, wherein the module limiter unit comprising:

a module limiter substrate 71 disposed in the module housing;

a module limiter sensor 73 disposed on the module limiter substrate; and a module limiter moving part 35 disposed on an outer circumferential portion of the module unit shuttle so as to correspond to a position of the module limiter sensor.

18. The operating module according to claim 17, wherein the module limiter moving part comprises:

an upper limiter moving part disposed on a circumferential top portion of a side of the module unit shuttle; and a lower limiter moving part disposed at a lower end of the module unit shuttle so as to be spaced apart from the upper limiter moving part.

19. The operating module according to claim 12, wherein a confirmation switch unit is further provided at the switch knob and is configured to generate a signal for confirming whether or not an operation selected by the user is performed when the vehicular multi-operating switch unit is operated by manipulation of the switch knob by a user.

20. The operating module according to claim 19, wherein a knob lighting unit is provided at the switch knob and is configured to display an operating state of the switch knob, including whether or not the switch knob is operated.

21. The operating module according to claim 20, wherein the switch knob comprises a knob housing, wherein a knob substrate is disposed in the knob housing, and wherein the knob lighting unit comprises:

a knob lighting element disposed on the knob substrate; and a knob lighting transfer unit configured to transfer light exiting the knob lighting element to an outside.

22. The operating module according to claim 21, wherein the knob lighting transfer unit comprises:

a knob lighting transfer body disposed in the knob housing;

a knob lighting transfer display part disposed on one surface of the knob lighting transfer body so as to be exposed to the outside; and a knob lighting transfer grating configured to prevent light entering the knob lighting transfer body from exiting the knob lighting transfer body to an outside.

23. The operating module according to claim 22, wherein the knob lighting element is disposed at a side of the knob lighting transfer body, and wherein the knob lighting transfer body comprises a knob lighting transfer side formed at a side thereof and configured to permit the incidence of light exiting the knob lighting element thereon.

24. The operating module according to claim 12, wherein the switch knob is coupled to a distal end of the switch shaft unit, the switch knob comprising: a knob housing including a knob marking part formed thereon so that light is transmitted to and from the knob housing through the knob marking part; and a knob lighting unit disposed in the knob housing so as to irradiate light to the knob marking part, wherein the knob lighting unit comprises a knob light source element configured to emit light, and a knob lighting guide configured to guide the light emitted from the knob light source element to the knob marking part, and wherein the knob lighting guide comprises:

a lighting guide body including a lighting guide light entering part formed at an outer edge thereof so as to confront the knob light source element; and a lighting guide light exiting part formed on one surface thereof so as to confront the knob marking part; and a lighting guide embossing part including one or more lighting guide reflective lugs formed protrudingly outwardly from the other surface of the lighting guide body so as to reflect light entering an inside of lighting guide body through the lighting guide light entering part to the lighting guide light exiting part.

\* \* \* \* \*